United States Patent
Hirata et al.

(10) Patent No.: US 8,013,487 B2
(45) Date of Patent: Sep. 6, 2011

(54) HYDRODYNAMIC BEARING DEVICE, AND SPINDLE MOTOR AND INFORMATION APPARATUS EQUIPPED WITH SAME

(75) Inventors: Koji Hirata, Ehime (JP); Keigo Kusaka, Ehime (JP); Takao Yoshitsugu, Ehime (JP); Yoshihito Watanabe, Ehime (JP); Hisaaki Yano, Ehime (JP)

(73) Assignee: Panasonic Corporation, Osaka (JP)

( * ) Notice: Subject to any disclaimer, the term of this patent is extended or adjusted under 35 U.S.C. 154(b) by 180 days.

(21) Appl. No.: 12/552,632

(22) Filed: Sep. 2, 2009

(65) Prior Publication Data

US 2010/0079022 A1 Apr. 1, 2010

(30) Foreign Application Priority Data

Sep. 26, 2008 (JP) ................. 2008-249158

(51) Int. Cl.
*H02K 5/167* (2006.01)
*F16C 32/06* (2006.01)

(52) U.S. Cl. ............ 310/90; 310/67 R; 360/98.07; 360/99.08; 384/110; 384/112

(58) Field of Classification Search ........ 310/97 R, 310/90; 360/98.07, 99.08; 384/100, 107, 384/110–114, 119–120, 124
See application file for complete search history.

(56) References Cited

U.S. PATENT DOCUMENTS

| | | | |
|---|---|---|---|
| 5,536,088 A * | 7/1996 | Cheever et al. | 384/107 |
| 6,059,459 A * | 5/2000 | Ichiyama | 384/112 |
| 6,672,767 B2 * | 1/2004 | Hajota et al. | 384/112 |
| 6,939,047 B2 * | 9/2005 | Gomyo et al. | 384/107 |
| 7,196,868 B2 * | 3/2007 | Asada et al. | 360/98.07 |
| 7,345,392 B2 | 3/2008 | Hafen et al. | |
| 7,758,246 B2 * | 7/2010 | Aiello et al. | 384/107 |
| 2005/0031236 A1 * | 2/2005 | Gomyo et al. | 384/110 |
| 2005/0099722 A1 * | 5/2005 | Nishimura et al. | 360/99.08 |
| 2005/0225187 A1 | 10/2005 | Hafen et al. | |
| 2005/0270693 A1 | 12/2005 | Rehm et al. | |
| 2006/0023982 A1 * | 2/2006 | Uenosono et al. | 384/100 |
| 2006/0039636 A1 * | 2/2006 | Ichiyama | 384/107 |
| 2007/0211971 A1 | 9/2007 | Obara et al. | |
| 2008/0036302 A1 | 2/2008 | Kim et al. | |
| 2008/0124013 A1 * | 5/2008 | Asada et al. | 384/112 |

FOREIGN PATENT DOCUMENTS

| | | |
|---|---|---|
| JP | 2005-257073 | 9/2005 |
| JP | 2005-304290 | 10/2005 |
| JP | 2008-43197 | 2/2008 |

* cited by examiner

*Primary Examiner* — Tran N Nguyen
(74) *Attorney, Agent, or Firm* — Wenderoth, Lind & Ponack, L.L.P.

(57) ABSTRACT

With a hydrodynamic bearing device 10, a first gap G1 is formed between a shaft 12 and a sleeve 11. A second gap G2 is formed between a sleeve cap 16 and the sleeve 11, and holds a lubricant 17. A thrust bearing member 21 is disposed near the inner peripheral surface of a center hole 16a of the sleeve cap 16. A third gap G3 is formed between the thrust bearing member 21 and the sleeve cap 16, and is open to the atmosphere. A fourth gap G4 is formed between the thrust bearing member 21 and the sleeve 11. The lubricant 17 circulates along a circulation passage that includes a communicating path 11b, the first gap G1 and the second gap G2.

21 Claims, 16 Drawing Sheets

HYDRODYNAMIC BEARING DEVICE, AND SPINDLE MOTOR AND INFORMATION APPARATUS EQUIPPED WITH SAME

CROSS-REFERENCE TO RELATED APPLICATIONS

This application claims priority to Japanese Patent Application No. 2008-249158. The entire disclosure of Japanese Patent Application No. 2008-249158 is hereby incorporated herein by reference.

BACKGROUND

1. Technical Field

The present invention relates to a hydrodynamic bearing device that is mounted in a hard disk drive apparatus or the like, and to a spindle motor that is equipped with this hydrodynamic bearing device.

2. Description of the Prior Art

Hydrodynamic bearing devices having hydrodynamic bearings that afford lower NRRO (non-repetitive runout) and are quieter because of non-contact rotation have been mainly used in recent years in hard disk drives (hereinafter referred to as HDDs) and other such disk driving apparatus.

With hydrodynamic bearing devices such as this, it is preferable to employ a configuration in which as much length as possible is ensured for the radial bearing portion formed in the gap between the shaft and the sleeve in order to increase the angular stiffness (or moment stiffness) of the hydrodynamic bearing. Meanwhile, because of the need to reduce the thickness of a spindle motor, the configuration has to be such that the radial bearing portion is long enough, while the thickness of the hydrodynamic bearing device does not increase. The "angular stiffness" here refers to the degree to which axial tilt caused by disturbance during operation is restored.

For example, Patent Document 1 (Japanese Laid-Open Patent Application 2008-43197) discloses a motor in which a flange-like plate fixed to a shaft is provided on the inner peripheral surface side of a sleeve cap, a boss is provided under a hub, and a seal is formed in the gap between the sleeve cap and the plate. With this configuration, the presence of a lubricant between the sleeve cap and the plate evens out the internal pressure and increases stability, and allows a better sealing effect to be obtained.

SUMMARY

Nevertheless, the following problems are encountered with the conventional hydrodynamic bearing device mentioned above.

Specifically, with the hydrodynamic bearing device disclosed in Patent Document 1, since a flange-like plate is added on the inner peripheral surface side of the sleeve cap, there is one more member in the axial direction than in the past, and no particular consideration is given to ensuring the axial length of the radial bearing portion. Thus, with a hydrodynamic bearing device that has been reduced in thickness, for example, adequate axial length of the radial bearing portion cannot be ensured, and there is the risk that the angular stiffness of the bearing will decrease.

It is an object of the present invention to provide a circulating type of hydrodynamic bearing device with which any bubbles contained in the lubricant can be efficiently discharged to the outside, while adequate axial length can be ensured for the radial bearing portion or other such hydrodynamic bearing portion, as well as a spindle motor equipped with this hydrodynamic bearing device.

The hydrodynamic bearing device pertaining to the first invention comprises a shaft, a sleeve, a first gap, a communicating path, a first hydrodynamic groove, a sleeve cap, a substantially circular second gap, a thrust bearing member, a third gap, a fourth gap, a lubricant, and a circulation passage. The sleeve has a bearing hole in which the shaft is mounted in a state of being capable of relative rotation. The first gap is formed between the shaft and the bearing hole of the sleeve. The communicating path is formed in part of the sleeve and allows communication between the open end side and the closed end side of the bearing hole in the sleeve. The first hydrodynamic groove is formed in the outer peripheral surface of the shaft and/or the inner peripheral surface of the bearing hole of the sleeve. The sleeve cap is provided on the open end side of the sleeve and has a center hole. The second gap is formed between the sleeve cap and the end surface on the open end side of the sleeve, and forms a lubricant reservoir. The thrust bearing member is fixed to the open end side of the shaft and is disposed so as to be near the inner peripheral surface of the center hole of the sleeve cap. The third gap is formed between the outer peripheral surface of the thrust bearing member and the inner peripheral surface of the center hole of the sleeve cap, and is open to the atmosphere. The fourth gap is formed between the thrust bearing member and the end surface of the sleeve. The lubricant accumulates in the first gap, the communicating path, the second gap, and the fourth gap, which communicate with each other. The circulation passage includes the communicating path, the first gap, and the second gap, and through which the lubricant circulates.

Here, the action of the hydrodynamic groove formed in the outer peripheral surface of the shaft and/or the inner peripheral surface of the bearing hole of the sleeve allows the shaft and sleeve to rotate free of contact, and in a state in which the first gap, the communicating path, the second gap, and the fourth gap formed by the thrust bearing member, the sleeve cap, the sleeve, the shaft, etc., communicate with each other, the lubricant fills these gaps. Also, the lubricant circulates through the device along a circulation passage that includes the first gap, the communicating path, and the second gap serving as a lubricant reservoir.

Consequently, when the sleeve cap is disposed so as to be near the outer peripheral surface of the thrust bearing member, the sleeve can be disposed right next to the thrust bearing member, so adequate axial length can be ensured for the sleeve. Thus, even when the thickness of the hydrodynamic bearing device is reduced, the axial length of the bearing portion can be ensured as long as possible, and the angular stiffness of the hydrodynamic bearing device can be increased. Also, since the lubricant is able to circulate through the device, and the supply of lubricant is not interrupted in the bearing gaps, there is no risk of lubricating film separation within the bearing. Also, even if bubbles accumulate inside the bearing, they can be smoothly bled off through the communicating path.

The hydrodynamic bearing device pertaining to the second invention is the hydrodynamic bearing device pertaining to the first invention, wherein the second gap that forms the lubricant reservoir is such that the size of the gap varies in the circumferential direction.

Here, the second gap that forms the lubricant reservoir in which the lubricant supplied to the bearing portion accumulates is formed such that the size of the gap varies in the circumferential direction around the shaft.

Here, the phrase "the size of the gap varies in the circumferential direction" may, for example, refer to a change in the gap size in the axial direction, and/or to a change in the gap size in the radial direction.

Consequently, the lubricant accumulated in the second gap that forms the lubricant reservoir can be held while being drawn in the direction of decreasing the size of the gap. Thus, leakage of the lubricant to the outside can be prevented.

The hydrodynamic bearing device pertaining to the third invention is the hydrodynamic bearing device pertaining to the first or second invention, wherein a second hydrodynamic groove that imparts a circulating force to the lubricant is formed in one or both of the opposite surfaces of the thrust bearing member and the end surface of the sleeve, which are opposite each other in the fourth gap.

Here, a circulating force for circulating the lubricant that fills the first to fourth gaps and the communicating path is imparted in the second hydrodynamic groove (thrust hydrodynamic groove) formed in one of the opposite surfaces that form the gap between the sleeve end surface and the thrust bearing member.

The hydrodynamic groove that imparts the above-mentioned circulating force here may be an asymmetrical herringbone groove, or may be a spiral groove.

Consequently, because the circulating force of the lubricant is generated in the thrust bearing portion, the first hydrodynamic groove in the radial bearing portion, etc., can be formed as a groove with a symmetrical shape. As a result, the bearing span of the symmetrical groove portion used as the bearing portion can be longer than in the past in the axial direction, etc. Thus, the bearing stiffness of the hydrodynamic bearing device can be increased.

The hydrodynamic bearing device pertaining to the fourth invention is the hydrodynamic bearing device pertaining to the third invention, wherein the second hydrodynamic groove has an asymmetrical herringbone shape or spiral shape.

Here, a groove with an asymmetrical herringbone shape or a spiral shape is used as the second hydrodynamic groove included in the thrust bearing portion formed between the sleeve end surface and the thrust bearing member.

Consequently, a circulating force can be easily imparted to the lubricant between the thrust bearing member and the sleeve end surface.

The hydrodynamic bearing device pertaining to the fifth invention is the hydrodynamic bearing device pertaining to the third or fourth invention, wherein the first hydrodynamic groove has a symmetrical shape.

Here, in the above-mentioned configuration that imparts a circulating force to the lubricant in the thrust bearing portion, a first hydrodynamic groove formed in the outer peripheral surface of the shaft and/or the bearing hole inner peripheral surface of the sleeve is formed in a symmetrical shape.

With a conventional hydrodynamic bearing device, circulating force was generated primarily by giving the radial hydrodynamic groove constituting a radial bearing portion or the like an asymmetrical shape, in order to circulate the lubricant through a circulation passage that includes the communicating path, but compared to when a symmetrical shape is used, this asymmetrical shape resulted in a substantial loss of bearing span due to the asymmetrical portion.

Consequently, since a circulating force can be imparted in the above-mentioned thrust bearing portion, the first hydrodynamic groove can have a symmetrical shape and better bearing span can be ensured in the axial direction than in the past. Consequently, the bearing stiffness of the hydrodynamic bearing device can be increased.

The hydrodynamic bearing device pertaining to the sixth invention is the hydrodynamic bearing device pertaining to any of the first to fifth inventions, wherein the sleeve cap has at its end surface a ventilation path that allows the second gap to communicate with the outside.

Consequently, any bubbles contained in the lubricant that has accumulated in the second gap (serving as the lubricant reservoir) can be efficiently discharged from the ventilation path formed in the end surface of the sleeve cap.

The hydrodynamic bearing device pertaining to the seventh invention is the hydrodynamic bearing device pertaining to any of the first to sixth inventions, wherein the second gap has a smallest gap part that is smallest in size in the axial direction near the communicating path, and has a largest gap part near the ventilation path that is largest in size in the axial direction from the communicating path toward the ventilation path, with the gap steadily increasing from the smallest gap part toward the largest gap part in the circumferential direction.

Consequently, in the second gap serving as the lubricant reservoir, the lubricant present near the largest gap part where the ventilation path is formed is drawn toward a side of the smallest gap part, where the gap is smaller, by the action of surface tension. As a result, this prevents the lubricant accumulated in the second gap from leaking to the outside from the ventilation path. Also, since the lubricant that circulates through the communicating path disposed near the smallest gap part does not readily move to the ventilation path side, leakage of the lubricant from the ventilation path to the outside can be avoided.

The hydrodynamic bearing device pertaining to the eighth invention is the hydrodynamic bearing device pertaining to any of the first to seventh inventions, further comprising a substantially circular fifth gap that is formed between the inner peripheral surface of the sleeve cap and the outer peripheral surface of the sleeve, and forms a lubricant reservoir.

Here, the substantially circular fifth gap formed between the inner peripheral surface of the sleeve cap and the outer peripheral surface of the sleeve is used as a lubricant reservoir.

Consequently, by providing a fifth gap that serves as a lubricant reservoir for accumulating lubricant, it can be ensured that enough lubricant will accumulate in the device, without being affected by the size of the bearing in the axial direction.

The hydrodynamic bearing device pertaining to the ninth invention is the hydrodynamic bearing device pertaining to the eighth invention, wherein the fifth gap that forms the lubricant reservoir is such that the size of the gap varies in the circumferential direction.

Here, the fifth gap that forms the lubricant reservoir in which the lubricant supplied to the bearing portion accumulates is formed such that the size of the gap varies in the circumferential direction around the shaft.

Here, the phrase "the size of the gap varies in the circumferential direction" may, for example, refer to a change in the gap size in the axial direction, or to a change in the size of the gap in the radial direction.

Consequently, the lubricant accumulated in the fifth gap that forms the lubricant reservoir can be held while being drawn in the direction of decreasing the size of the gap. Thus, leakage of the lubricant to the outside can be prevented.

The hydrodynamic bearing device pertaining to the tenth invention is the hydrodynamic bearing device pertaining to the eighth or ninth invention, wherein the sleeve cap has on its outer peripheral surface a ventilation path that allows the fifth gap to communicate with the outside.

Consequently, any bubbles contained in the lubricant that has accumulated in the fifth gap (serving as the lubricant reservoir) can be efficiently discharged from the ventilation path formed in the outer peripheral surface of the sleeve cap.

The hydrodynamic bearing device pertaining to the eleventh invention is the hydrodynamic bearing device pertaining to any of the eighth to tenth inventions, wherein the fifth gap has a smallest gap part that is smallest in size in the radial direction near the communicating path, and has a largest gap part near the ventilation path that is largest in size in the radial direction from the communicating path toward the ventilation path, with the gap steadily increasing from the smallest gap part toward the largest gap part in the circumferential direction.

Consequently, in the fifth gap serving as the lubricant reservoir, the lubricant present near the largest gap part where the ventilation path is formed is drawn toward the smallest gap part, where the gap is smaller, by the action of surface tension. As a result, this prevents the lubricant accumulated in the fifth gap from leaking to the outside from the ventilation path. Also, since the lubricant that circulates through the communicating path disposed near the smallest gap part does not readily move to the ventilation path side, leakage of the lubricant from the ventilation path to the outside can be avoided.

The hydrodynamic bearing device pertaining to the twelfth invention is the hydrodynamic bearing device pertaining to any of the first to eleventh inventions, wherein the axial thickness of the thrust bearing member is less than or substantially equal to the axial thickness of the sleeve cap.

Here, the thrust bearing member that is disposed nearby so as to be aligned in the radial direction is formed so that its axial thickness is less than or substantially equal to the thickness of the sleeve cap.

Consequently, an adequate bearing span can be ensured, without being reduced by the thickness of the thrust bearing member.

The hydrodynamic bearing device pertaining to the thirteenth invention is the hydrodynamic bearing device pertaining to any of the first to twelfth inventions, wherein the shaft is flangeless, further comprising a hub that is fixed to the end of the shaft on the open end side. The sleeve has a flange that protrudes outward in the radial direction, and the hub has a retainer that limits movement of the flange in the axial direction.

Here, with the above-mentioned constitution in which the thrust bearing portion is formed between the sleeve end surface and the thrust bearing member, when a so-called flangeless shaft is used, a flange that protrudes from the outer peripheral surface of the sleeve outward in the radial direction comes into contact with a retainer that is part of the hub, and this constitutes a retaining mechanism.

Consequently, when the above-mentioned thrust bearing member is used, since there is no need to provide the shaft with a flange to constitute the thrust bearing portion, a flangeless shaft can be used. When a flangeless shaft is used, a retaining structure is necessary to prevent the shaft from coming loose in the axial direction, and a retaining structure can be easily constituted by employing the above-mentioned flange and retainer.

The hydrodynamic bearing device pertaining to the fourteenth invention is the hydrodynamic bearing device pertaining to any of the first to twelfth inventions, wherein the shaft has a retainer flange on the closed end side.

Here, with a hydrodynamic bearing device in which the thrust bearing portion is constructed between the thrust bearing member and the sleeve end surface, a retainer flange member is used at one end on the closed end side of the shaft.

Here, since there is no need to form a thrust hydrodynamic groove or the like, a relatively thin member can be used as the retainer flange member.

Consequently, a retainer structure can be formed with no loss of bearing length in the axial direction.

The hydrodynamic bearing device pertaining to the fifteenth invention is the hydrodynamic bearing device pertaining to any of the first to fourteenth inventions, wherein, if we let G1 be the size of the first gap, G2min be the size of the smallest gap part of the second gap, G2max be the largest gap part of the second gap, G3 be the size of the third gap, and G4 be the smallest gap part of the fourth gap, the following relational formulas are satisfied.

$$G1 < G4 \leq G2min < G3$$

$$G2min < G2max$$

Consequently, in the open portion formed by the inner peripheral surface of the sleeve cap and the outer peripheral surface of the thrust bearing member, which are opposite one another at the sleeve upper end surface, the lubricant is held inside the bearing by surface tension, and can be prevented from running out from the open portion.

Thus, any bubbles that are trapped inside the bearing will move to the portion where the gap of the sleeve cap is wider and eventually be discharged from the ventilation path, so the bearing gaps can be filled with lubricant and a highly reliable bearing obtained.

The hydrodynamic bearing device pertaining to the sixteenth invention is the hydrodynamic bearing device pertaining to any of the first to fifteenth inventions, wherein the sleeve cap further has a plurality of protrusions protrude toward the end surface of the sleeve that is disposed opposite each other, and come into contact with the end surface on the open end side of the sleeve.

Consequently, even if the sleeve cap is formed from a thin (about 30 to 100 μm, for example) metal or resin sheet, variance in the smallest gap part between the sleeve cap and the sleeve end surface can be maintained precisely at about 10 μm.

The hydrodynamic bearing device pertaining to the seventeenth invention is the hydrodynamic bearing device pertaining to any of the first to sixteenth inventions, wherein the sleeve cap is formed from a translucent material.

Consequently, the amount of lubricant held in the second gap formed in the gap between the sleeve cap and the end surface of the sleeve on the open end side can be easily ascertained visually through the sleeve cap, which makes it easier to manage the lubricant level.

The hydrodynamic bearing device pertaining to the eighteenth invention is the hydrodynamic bearing device pertaining to the seventeenth invention, wherein the sleeve cap includes a translucent portion on the end surface where the ventilation path is formed.

Here, a translucent portion is disposed at the end surface where the ventilation path is formed, which is part of the outer peripheral surface side of the substantially cylindrical portion of the sleeve cap.

Consequently, when the hydrodynamic bearing device pertaining to the present invention is oiled, the amount of oil used can be adjusted while checking the position of the vapor-liquid interface of the lubricant from the translucent end surface. As a result, oiling can be carried out more precisely.

The hydrodynamic bearing device pertaining to the nineteenth invention is the hydrodynamic bearing device pertaining to the seventeenth invention, wherein the sleeve cap includes a translucent portion on the outer peripheral surface side where the ventilation path is formed.

Here, the portion around the ventilation path formed on the outer peripheral surface of the sleeve cap is made, for example, of a translucent material. The translucent portion here may be the entire sleeve cap, or just a part around the ventilation path.

Consequently, when oiling is performed through the ventilation path formed on the outer peripheral surface of the sleeve cap, the person doing the work can easily look through the translucent portion to check how high the lubricant level is. Thus, the lubricant fill state can be checked visually, which avoids overfilling, so work such as wiping up unnecessary lubricant after oiling can be eliminated, and this makes the oiling work more efficient.

The spindle motor pertaining to the twentieth invention comprises the hydrodynamic bearing device according to any of the first to nineteenth inventions, a rotary magnet attached to a rotating-side member of the hydrodynamic bearing device, and a stator core that imparts rotational force to the rotary magnet.

Consequently, even if the hydrodynamic bearing device has been made thinner, the same effect as above can be achieved, namely, the axial length of the bearing portion can be ensured to its full potential, the angular stiffness of the hydrodynamic bearing device can be increased, and bubbles can be smoothly discharged through the communicating path.

The information apparatus pertaining to the twenty-first invention is equipped with the spindle motor pertaining to the twentieth invention.

Consequently, even if the device has been made thinner, the same effect as above can achieved, namely, the axial length of the bearing portion can be ensured to its full potential, the angular stiffness of the hydrodynamic bearing device can be increased, and bubbles can be smoothly discharged through the communicating path.

DETAILED DESCRIPTION OF THE PREFERRED EMBODIMENTS

A spindle motor 1 comprising a hydrodynamic bearing device 10 pertaining to an embodiment of the present invention will now be described through reference to FIGS. 1 to 8.

Configuration of Spindle Motor 1

Figure 1:
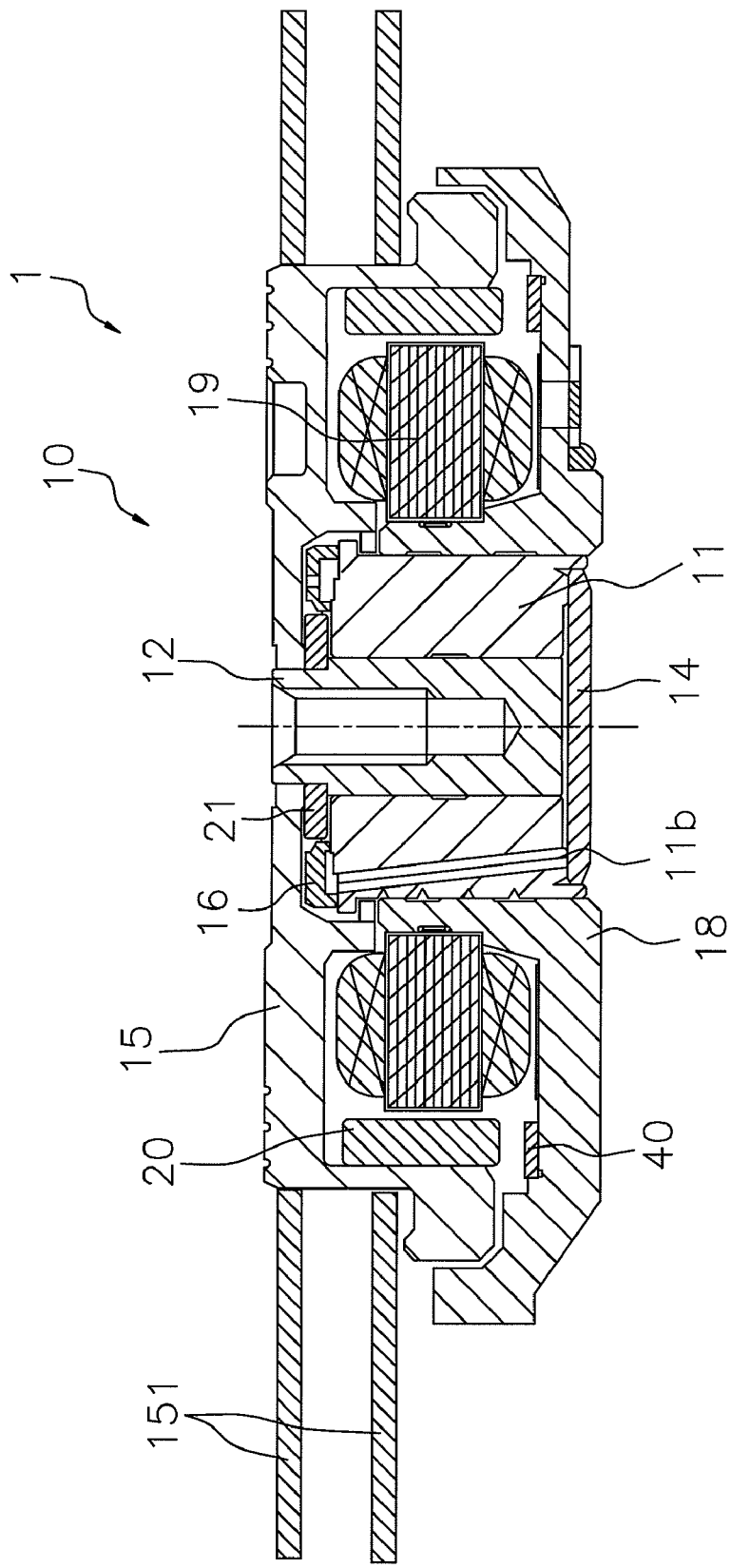
FIG. 1 is a cross section of the structure of a spindle motor equipped with the hydrodynamic bearing device pertaining to an embodiment of the present invention.

As shown in FIG. 1, the spindle motor 1 according to the embodiment 1 is a device for rotationally driving a disk-shaped recording disk (recording medium) 151, and mainly comprises the hydrodynamic bearing device 10, a base 18, a stator core 19, and a rotor magnet 20.

In order to rotate a magnetic recording disk around a shaft 12, the hydrodynamic bearing device 10 smoothly rotates rotatable-side members including a rotor hub (hub) 15 on which the magnetic recording disk is mounted, in a state of non-contact with respect to stationary-side members (a sleeve 11, etc.). The configuration of the hydrodynamic bearing device 10 will be described in detail below.

The base 18 serves as the base portion of the stator core 19 and the hydrodynamic bearing device 10. The base 18 is formed from a non-magnetic aluminum-based metal material (such as ADC12) or a magnetic iron-based metal material (such as SPCC or SPCD). If the base 18 is made from a non-magnetic material, an attraction plate 40 formed separately from a magnetic material is provided at a location opposite the end surface of the rotor magnet 20.

The stator core 19 is fixed to the base 18, and its outer peripheral part is disposed at a location opposite the rotor magnet 20, with a specific gap maintained from the inner peripheral part thereof. A plurality of salient poles are formed facing outward on the stator core 19, and a coil is wound around each of these salient poles. The stator core 19 is formed by laminating silicon steel sheets with a thickness of 0.15 to 0.35 mm (mainly, 0.15 mm, 0.20 mm, and 0.35 mm).

The rotor magnet 20 is in the form of a circular ring, is fixed to the surface on the outer peripheral side of a cylindrical part that hangs down from the flange part of the rotor hub 15, and constitutes a magnetic circuit along with the stator core 19 that is wound with a coil (stator coil). In this embodiment, the description is of an outer rotor type of hydrodynamic bearing device in which the rotor magnet 20 is disposed around the outer peripheral surface of the stator core 19, but the hydrodynamic bearing device may instead be an inner rotor type in which a rotor magnet is disposed around the inner peripheral surface of a stator core on which a plurality of salient poles are formed toward the inner peripheral surface.

The recording disk 151 is placed on a disk placement part of the rotor hub 15. For example, a disk-shaped damper or the like (not shown) having spring properties in the axial direction is set with a tapping screw (not shown). Here, when the tapping screw is threaded into a screw tap part provided in the middle of the shaft 12, the recording disk 151 is pressed downward in the axial direction by the damper and clamped between the clamper and the disk placement part of the rotor hub 15.

Configuration of Hydrodynamic Bearing Device 10

Figure 2:
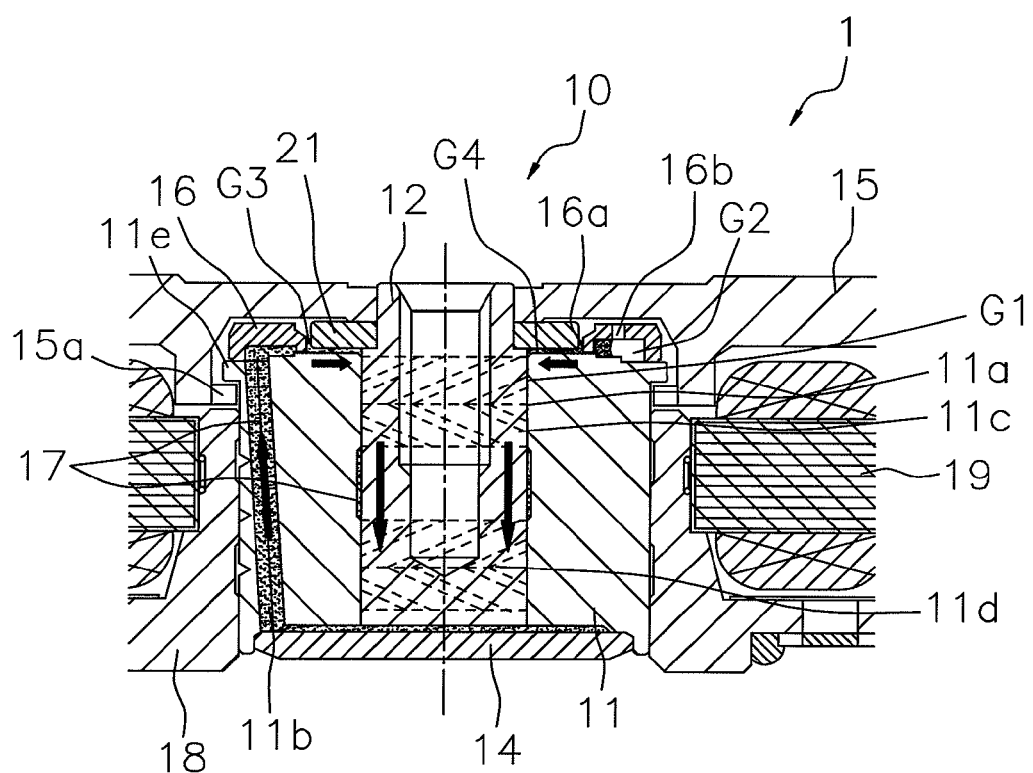
FIG. 2 is a partial cross section of the structure of the hydrodynamic bearing device included in the spindle motor of FIG. 1.

As shown in FIGS. 1 and 2, the hydrodynamic bearing device 10 pertaining to this embodiment comprises the sleeve 11, the shaft 12, a thrust plate 14, the rotor hub (hub) 15, a sleeve cap 16, a lubricant 17, and a thrust bearing member 21.

Figure 4:
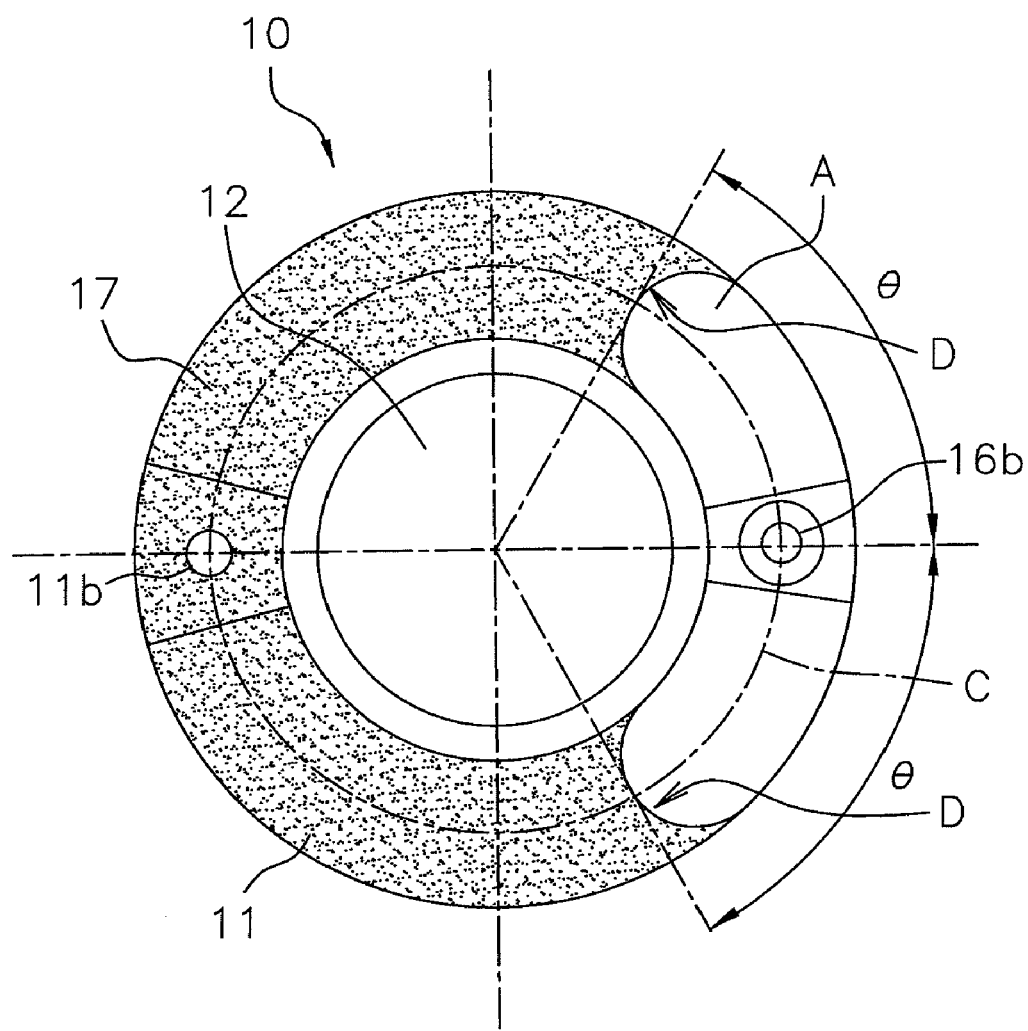
FIG. 4 is a plan view of the structure of the lubricant reservoir of the hydrodynamic bearing device of FIG. 2.
Figure 5:
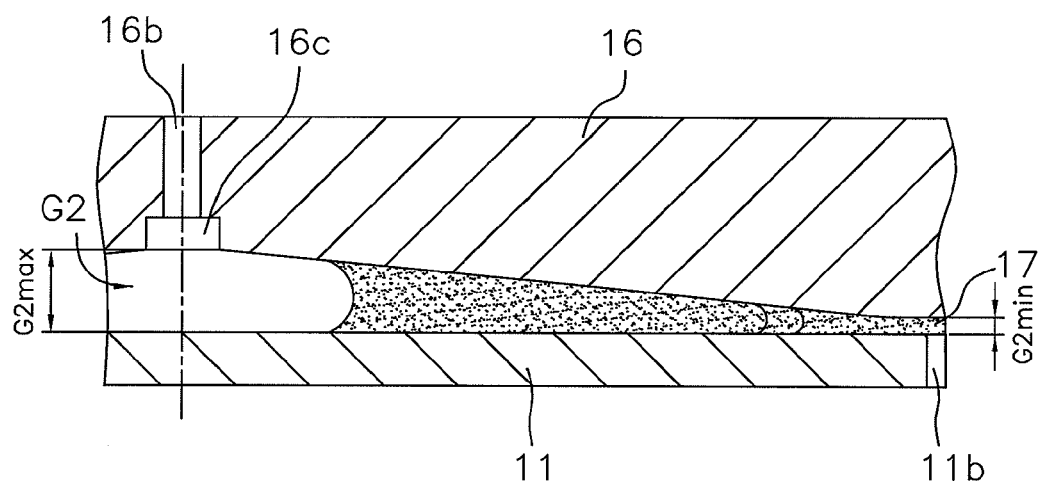
FIG. 5 is a development view in which the lubricant reservoir of FIG. 4 has been developed in the circumferential direction.

The sleeve 11 has a communicating path 11b that allows the open and closed end sides of a bearing hole 11a to communicate. The sleeve 11 also has a substantially circular second gap G2, which serves as a lubricant reservoir, between itself and the sleeve cap 16 fixed to the end surface on the open end side. The substantially circular second gap G2 is formed so as to link with the communicating path 11b. The size of the second gap G2 in the axial direction varies in the circumferential direction (see FIG. 5), narrowing near the communicating path 11b, widening as it moves away from the communicating path 11b, and reaching a maximum near a ventilation path 16b. FIG. 5 shows a cross section of the second gap G2 serving as a lubricant reservoir, in the radial direction and along the circle C shown in FIG. 4.

As shown in FIG. 5, in this second gap G2, the gap size in the axial direction near the communicating path 11b is the smallest gap part G2min. The gap size in the axial direction near the ventilation path 16b, as shown in FIG. 5, is the largest gap part G2max. The gap size in the axial direction of the portion of the second gap G2 where the lubricant 17 is held includes the portions that are the smallest gap part G2min and the largest gap part G2max, and this gap size steadily varies in the circumferential direction.

In this embodiment, as shown in FIG. 5, the second gap G2 serving as a lubricant reservoir is formed in a tapered shape so as to steadily vary in the circumferential direction. Accordingly, any bubbles contained in the lubricant 17 held in the bearing that have circulated in from the communicating path 11b can be moved in the axial direction to the side of this taper where the gap size is larger, thereby making vapor-liquid separation possible. Also, the largest gap part is formed so that the gap size near the ventilation path 16b in the axial direction is greater than the gap size of the second gap G2 in the axial direction. Accordingly, since any trapped bubbles are held in the largest gap part regardless of the orientation of the hydrodynamic bearing device 10, and the ventilation path 16b is formed near this part, this configuration reduces leakage of the lubricant 17 from the ventilation path 16b due to vibration or impact or to thermal expansion of the lubricant. Furthermore, it is preferable if an enlarged part 16c that is greater in size or diameter than the ventilation path 16b is provided on the second gap G2 side of the ventilation path 16b. This further reduces leakage of the lubricant 17 from the ventilation path 16b.

The shaft 12 is inserted into the bearing hole 11a of the sleeve 11 in a state of being able to rotate via a first gap G1. Radial hydrodynamic grooves 11c and 11d are formed in the inner peripheral surface of the bearing hole 11a of the sleeve 11. The radial hydrodynamic grooves 11c and 11d may instead be formed on the outer peripheral surface of the shaft 12.

Figure 3:
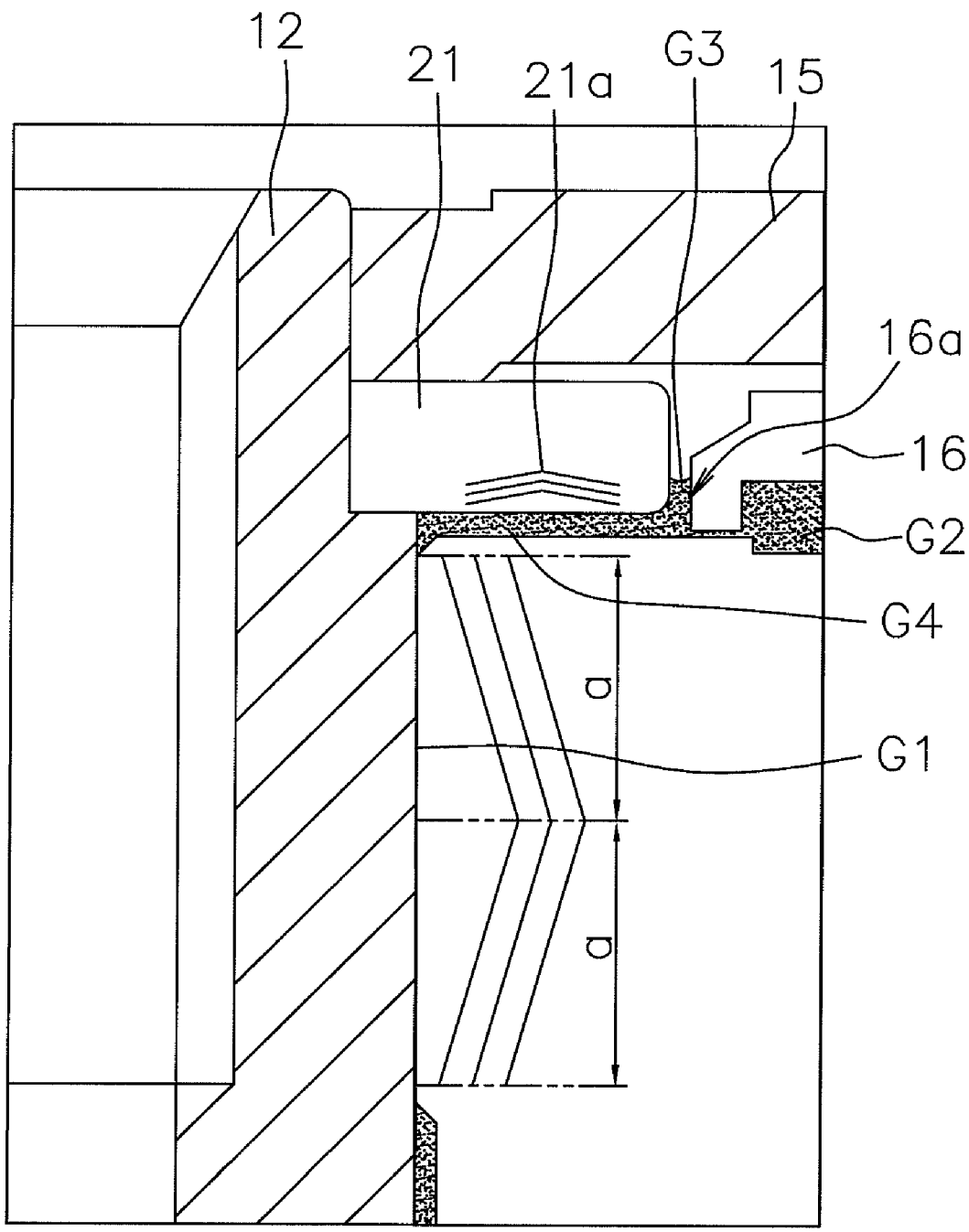
FIG. 3 is a detail cross section of the structure around the thrust bearing member in the hydrodynamic bearing device of FIG. 2.

As shown in FIG. 3, the radial hydrodynamic grooves 11c and 11d are in (a:a) left and right symmetry, and are formed in the same size. Thus, if the same pattern is formed above and below, and the size of the gap is the same, a circulating force that would circulate the lubricant 17 will not be produced in these radial hydrodynamic grooves 11c and 11d.

The rotor hub 15 is fixed to the upper end of the shaft 12, and is fixed so as to sandwich the thrust bearing member 21 (discussed below) in the axial direction along with a stepped portion of the shaft 12. Also, the rotor hub 15 has on its outer peripheral portion a disk placement part on which the recording disk 151 is mounted. Furthermore, the rotor hub 15 has, at the portion that hangs down and is close to the outer peripheral surface of the sleeve 11, a retainer 15a that hits a flange 11e provided to the outer peripheral surface of the sleeve 11. The retainer 15a is fixed to part of the rotor hub 15 by crimping, press fitting, or welding. Consequently, even if the flangeless shaft 12 should move in the axial direction, the flange 11e and the retainer 15a will come into contact, so relative movement in the axial direction is restricted and a retaining structure is realized.

As shown in FIGS. 2 and 3, the sleeve cap 16 has a center hole 16a and is fixed to the upper end surface of the sleeve 11. The center hole 16a is disposed in the inner peripheral surface, near and opposite the outer peripheral surface of the thrust bearing member 21 (discussed below). A third gap G3 that allows the lubricant 17 to communicate with the outside is formed in the gap between the outer peripheral surface of the thrust bearing member 21 and the inner peripheral surface of the sleeve cap 16.

The lubricant 17 is an oil, a high-fluidity grease, an ionic liquid, or the like, is held in microscopic gaps including the first to fourth gaps G1 to G4, and moves under surface tension toward a narrower gap. Accordingly, as shown in FIG. 4, the portion of larger axial direction gap near the ventilation path 16b that communicates with the outside is an empty part where an air A is present and no lubricant 17 is present in the second gap G2. The lubricant 17 is held in a state of being linked within the third gap G3 and the fourth gap G4, at least in the portions where the first gap G1, the communicating path 11b, and the second gap G2 are small gaps.

The sleeve 11 or the stator core 19 is attached to the base 18. The rotor magnet (rotary magnet) 20 is fixed to the rotor hub 15 at a location opposite the stator core 19, and a magnetic disk, optical disk, or another such recording disk 151 is attached as needed.

The thrust bearing member 21 is a substantially disk-shaped member, and has a thickness (axial thickness) that is substantially the same as or less than that of the sleeve cap 16 disposed opposite in the radial direction. The thrust bearing member 21 may be slightly thinner than the sleeve cap 16. The thrust bearing member 21 is fixed along with the rotor hub 15 to a stepped portion at the upper end of the shaft 12. As shown in FIG. 3, the fourth gap G4 is formed between the thrust bearing member 21 and the opposing end surface of the sleeve 11 on the open end side. The thrust bearing member 21 has a thrust hydrodynamic groove (second hydrodynamic groove) 21a that imparts a circulating force to the lubricant 17 at the surface opposite the sleeve 11 that forms the fourth gap G4, so that the lubricant 17 circulates from the fourth gap G4 toward the first gap G1.

The thrust hydrodynamic groove 21a is a groove with an asymmetrical herringbone shape or spiral shape, and constitutes a thrust bearing portion in the fourth gap G4. The thrust hydrodynamic groove is not limited to being formed on the thrust bearing member 21 side, and may instead be formed on the opposing end surface of the sleeve 11.

Operation of Hydrodynamic Bearing Device 10

As shown in FIGS. 1 and 2, with the hydrodynamic bearing device 10 of this embodiment, power is successively sent to the stator core 19 to generate a rotary magnetic field between it and the rotor magnet 20, which causes the rotating-side members including the shaft 12 to begin rotating. When the shaft 12 starts to rotate, the radial hydrodynamic grooves 11c and 11d and the thrust hydrodynamic groove 21a generate pressure by scraping up the lubricant 17. At this point the shaft 12 rotates in a non-contact state of floating in the lubricant 17.

As discussed above, the thrust hydrodynamic groove 21a has a groove shape that imparts circulating force to the lubricant 17. Accordingly, the lubricant 17 circulates in the direction indicated by the arrow in FIG. 2, from the first gap G1 to the communicating path 11b, then to the smallest gap part G2min of the second gap G2, and then to the fourth gap G4. A force of this circulation of the lubricant 17 allows any bubbles generated within the bearing by aeration or cavitation to be moved through the communicating path 11b to a vacant area of the largest gap part G2max of the second gap G2.

Meanwhile, the lubricant 17 is kept in smaller gaps by the force of surface tension. Accordingly, bubbles are purged toward wider gaps, and are discharged out of the bearing through the ventilation path 16b.

As shown in FIG. 2, during rotation of the shaft 12, the lubricant 17 flows through the communicating path 11b in the direction indicated by the arrow in the drawing. That is, the lubricant 17 is drawn from the communicating path 11b, through the second gap G2 and the fourth gap G4, to the first gap G1 between the sleeve 11 and the shaft 12. Since the fourth gap G4 is sufficiently small (about 10 to 50 μm), it is always in a state of being filled by the lubricant 17 under surface tension.

Since the third gap G3 is open to the atmosphere, some means for preventing oil leakage is necessary at this place. With the hydrodynamic bearing device 10 in this embodiment, when the bearing is stationary, the surface tension of the lubricant 17 creates an oil seal.

We will here let Pi be the surface tension that pulls the lubricant 17 in the inner circumferential direction in the third gap G3, Po be the surface tension that pulls the lubricant 17 in the opposite direction (the outer circumferential direction), and Pu be the surface tension that pulls the lubricant 17 upward (leakage direction). If the relationship between these numerical values satisfies the following relational formula (1), the lubricant 17 will not leak out of the third gap G3. Furthermore, surface tension causes the lubricant 17 to flow toward the first gap G1 formed between the sleeve 11 and the shaft 12.

$$Pi > Po > Pu \quad (1)$$

For the above-mentioned relational formula (1) to be satisfied, the size relationship between the gaps must satisfy the following relational formulas (2) and (3).

$$G1 < G4 \leq G2min < G3 \quad (2)$$

$$G2min < G2max \quad (3)$$

Specifically, in this embodiment, the gap size relationships are incorporated into the constitution of the hydrodynamic bearing device 10 discussed above, which more effectively gives a hydrodynamic bearing device 10 in which there is no leakage of the lubricant 17 to the outside, and reliability is better.

Bearing Span extended in Hydrodynamic Bearing Device 10

With the hydrodynamic bearing device 10 in this embodiment, as discussed above, a thrust bearing portion is provided in the gap between the opposing surfaces of the thrust bearing member 21 and the sleeve 11. The thrust hydrodynamic groove 21a that constitutes the thrust bearing portion has a groove shape (asymmetrical herringbone shape or spiral shape) that imparts a circulating force to the lubricant 17. Thus, the radial hydrodynamic grooves 11c and 11d are formed as grooves with a symmetrical shape and the same size.

Figure 6:
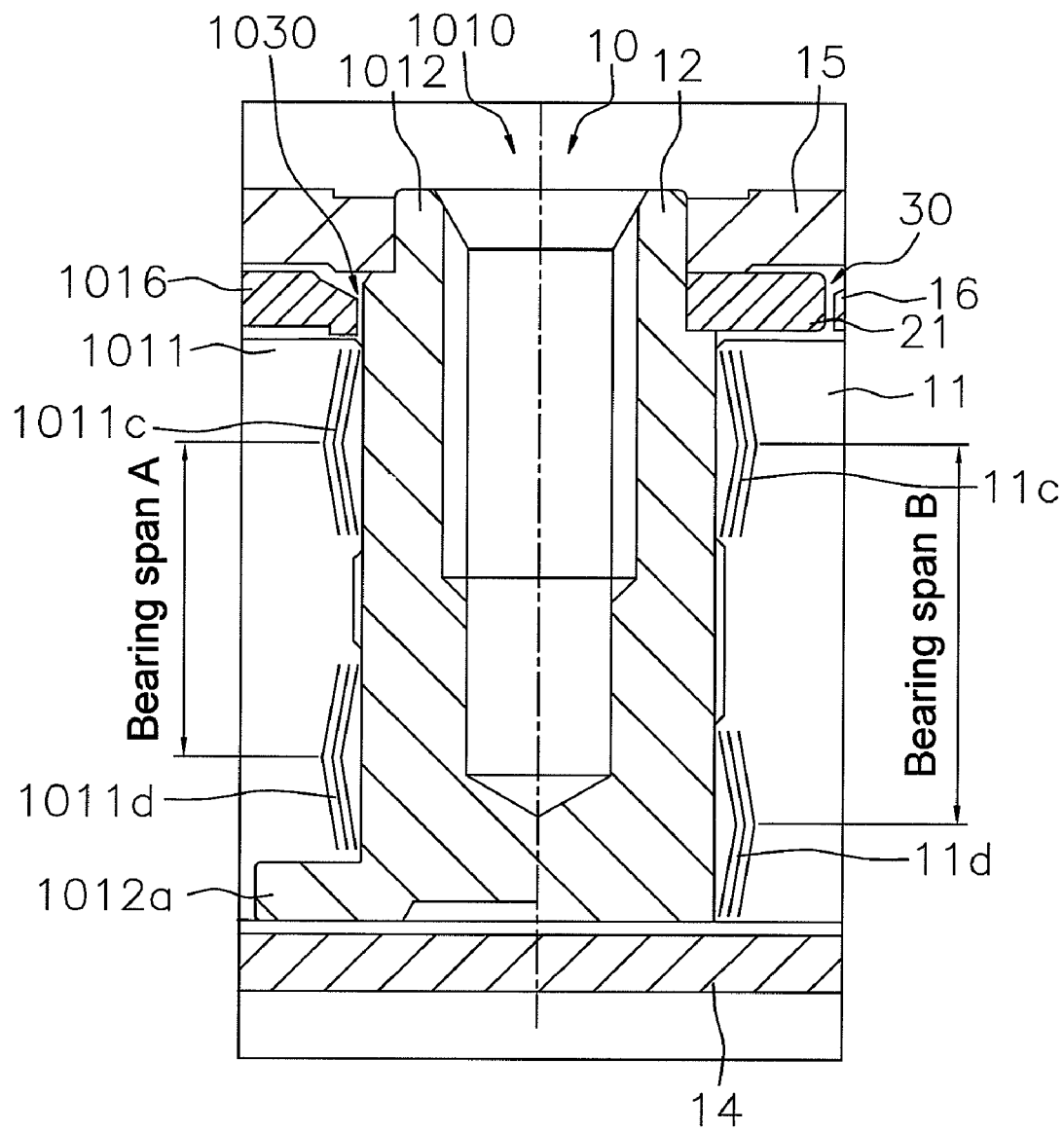
FIG. 6 on the right side is a partial cross section of the hydrodynamic bearing device pertaining to the present invention, and on the left side is a partial cross section of a conventional hydrodynamic bearing device.

The left half of FIG. 6 shows the configuration of a conventional hydrodynamic bearing device 1010, while the right half shows the configuration of the hydrodynamic bearing device 10 of this embodiment.

The hydrodynamic bearing device 1010 has a radial bearing portion provided in the gap between a shaft 1012 and a sleeve 1011, and radial hydrodynamic grooves 1011c and 1011d formed in the sleeve 1011 are disposed at a bearing span A.

Meanwhile, with the hydrodynamic bearing device 10 of this embodiment, the radial hydrodynamic grooves 11c and 11d, which are symmetrical in the axial direction, are disposed at a bearing span B. With the conventional hydrodynamic bearing device 1010, there is a thrust flange 1012a that is formed on or fixed to the shaft 1012, and the bearing span A is shortened. On the other hand, with the hydrodynamic bearing device 10 of this embodiment, since the thrust bearing member 21 is disposed within the thickness of the sleeve cap 16, there is no shortening of the axial distance over which the radial hydrodynamic grooves 11c and 11d can be disposed. An opening 30 can be disposed at the same location in the axial direction. A comparison of the hydrodynamic bearing device 10 and the conventional hydrodynamic bearing device 1010 reveals that, as shown in FIG. 6, the hydrodynamic bearing device 10 of this embodiment has a bearing span in the axial direction that is greater than that of the conventional hydrodynamic bearing device 1010 by an amount equivalent to the conventional thrust flange 1012a.

Figure 7:
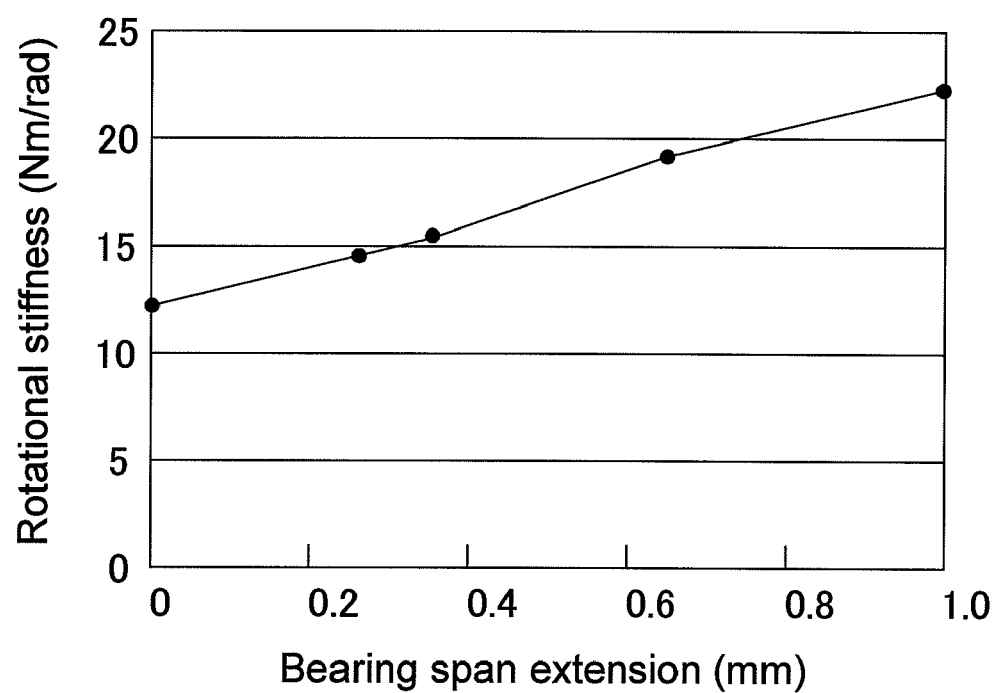
FIG. 7 is a graph of the relationship between rotational stiffness and the extension length of the bearing span, compared to the bearing span of a conventional hydrodynamic bearing device.
Figure 8:
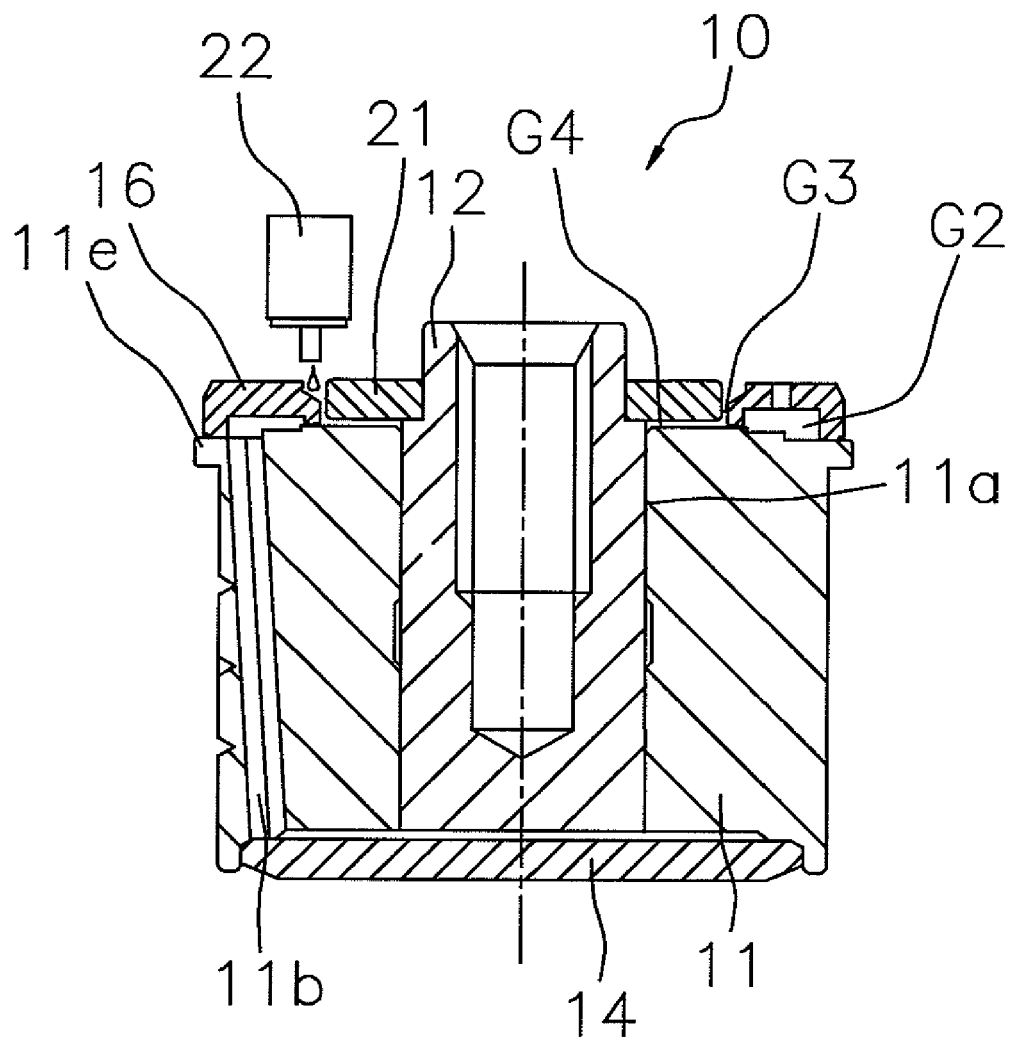
FIG. 8 is a cross section of part of the process of adding a lubricant to the hydrodynamic bearing device of FIG. 2.

The graph in FIG. 7 shows the difference between the bearing spans A and B of the hydrodynamic bearing device 10 and the hydrodynamic bearing device 1010, that is, the relationship between the bearing span extension (mm) expressed by "bearing span B−bearing span A" and the rotational stiffness (Nm/rad) in the hydrodynamic bearing device 10.

As shown in FIG. 7, as the bearing span extension (mm) increases, the rotational stiffness of the hydrodynamic bearing device 10 rises. More specifically, when the bearing span extension grew by 0.2 mm, an increase in rotational stiffness of approximately 2 Nm/rad was seen. As a result, this indicates that keeping the bearing span at the maximum increases angular stiffness or rotational stiffness, which expresses the force for returning the shaft 12 to its original upright orientation when it has tilted with respect to the sleeve 11.

As discussed above, the maximum bearing span of the radial hydrodynamic grooves 11c and 11d can be ensured by making the shaft 12 flangeless and disposing the radial hydrodynamic grooves 11c and 11d symmetrically in the axial direction. As a result, as shown in the graph of FIG. 7, the bearing span can be extended and the bearing stiffness increased more than in the past.

Method for Oiling the Hydrodynamic Bearing Device 10

In this embodiment, when the lubricant 17 is added to the hydrodynamic bearing device 10 having the constitution discussed above, as shown in FIG. 8, the oiling is performed from the third gap G3 using an injector tube, dispenser, or other such oiling apparatus 22.

More specifically, first the oiling apparatus 22 is brought near the third gap G3 under a reduced pressure environment, and the lubricant 17 is introduced in the specified amount, or in an amount that is somewhat greater than what is actually needed for oiling.

After this, the area around the hydrodynamic bearing device 10 is repressurized to a higher pressure, such as atmospheric pressure, so that the lubricant 17 flows completely into the bearing. While the lubricant 17 is being introduced, the shaft 12 may be rotated so that the lubricant 17 is introduced by the pumping force of the hydrodynamic grooves 11c, 11d, and 21a. Alternatively, the lubricant 17 may be introduced in an amount somewhat larger than what is needed for oiling using the oiling apparatus 22 under an environment of atmospheric pressure, etc., after which the pressure is reduced by vacuum suction to a pressure lower than this atmosphere, and the lubricant 17 is introduced by replacing the air inside the bearing.

Next, a suction tube (not shown) is inserted in the third gap G3 between the inner peripheral surface of the thrust bearing member 21 and the sleeve cap 16, and any excess oil is suctioned off, so that the amount of lubricant 17 can be suitably controlled.

As a result, the lubricant 17 can be introduced and suctioned out easily from the upper surface side of the hydrodynamic bearing device 10.

In order to facilitate the work entailed by this oiling step, and to perform the oiling more accurately, it is preferable if all or part of the sleeve cap 16 is formed from a translucent material. In this case, the lubricant 17 can be introduced while monitoring the position of the vapor-liquid interface of the lubricant 17 visually or with a camera, etc. by checking the angle θ, which means that more accurate oiling can be performed. Thus, the work of oiling can be made more efficient.

Features of the Hydrodynamic Bearing Device 10

(1) As shown in FIG. 2 and elsewhere, the hydrodynamic bearing device 10 in this embodiment comprises the shaft 12, the sleeve 11, the first gap G1, the communicating path 11b, the radial hydrodynamic grooves 11c and 11d, the sleeve cap 16, the second gap G2 having a substantially toric shape, the thrust bearing member 21, the third gap G3, the fourth gap G4, the lubricant 17, and a circulation passage for the lubricant 17. The sleeve 11 is mounted in a state that allows the relative rotation of the shaft 12, and has the bearing hole 11a. The first gap G1 is formed between the shaft 12 and the bearing hole 11a of the sleeve 11. The communicating path 11b is formed in part of the sleeve 11, and allows the open and closed end sides of the bearing hole 11a to communicate in the sleeve 11. The radial hydrodynamic grooves 11c and 11d are formed on the inner peripheral surface of the bearing hole 11a of the sleeve 11. The sleeve cap 16 is provided on the open end side of the sleeve 11, and has the center hole 16a. The second gap G2 is formed between the end surface on the open end side of the sleeve 11 and the sleeve cap 16, and forms a lubricant reservoir in which the lubricant 17 is held. The thrust bearing member 21 is joined on the open end side of the shaft 12, and is disposed so as to be near the inner peripheral surface of the center hole 16a of the sleeve cap 16. The third gap G3 is formed between the inner peripheral surface of the center hole 16a of the sleeve cap 16 and the outer periphery of the thrust bearing member 21, and is open to the atmosphere. The fourth gap G4 is formed between the end surface of the sleeve 11 and the thrust bearing member 21. The lubricant 17 is held in the first gap G1, the communicating path 11b, the second gap G2, and the fourth gap G4, which all communicate with each other. The lubricant 17 circulates along a circulation passage including the communicating path 11b, the first gap G1, and the second gap G2.

Consequently, while the lubricant 17 is circulating through the device, any bubbles contained in the lubricant 17 can be effectively discharged from the ventilation path 16b, the third gap G3, etc., which are open to the outside.

Also, when the flangeless shaft 12 is combined with the thrust bearing member 21, and the thrust bearing portion is disposed between the end surface of the sleeve 11 and the thrust bearing member 21, the sleeve 11 can be extended right up next to the thrust bearing member 21. Thus, the maximum bearing span can be ensured for the radial bearing portion in the axial direction.

As a result, even with a hydrodynamic bearing device 10 that has been made thinner, the maximum bearing span can be ensured in the axial direction of the radial bearing portion, so the angular stiffness of the hydrodynamic bearing device 10 can be increased, and bubbles in the lubricant 17 can be smoothly discharged through the communicating path 11b.

(2)

With the hydrodynamic bearing device 10 in this embodiment, as shown in FIG. 5, the second gap G2 serving as the lubricant reservoir is formed such that its size varies in the circumferential direction.

Consequently, the lubricant 17 in the second gap G2 can be held while being drawn toward a smaller gap. Thus, regardless of the orientation of the hydrodynamic bearing device 10, air can be kept near the ventilation path 16b, so leakage of the lubricant 17 from the ventilation path 16b, etc., to the outside can be easily avoided.

(3)

With the hydrodynamic bearing device 10 in this embodiment as shown in FIG. 3, the thrust hydrodynamic groove 21a that imparts a circulating force to the lubricant 17 is provided to the surface of the thrust bearing member 21 that is opposite the sleeve 11.

Consequently, there is no need to employ an asymmetrical shape or the like for producing a circulating force on the radial hydrodynamic grooves 11c and 11d side, and the radial hydrodynamic grooves 11c and 11d can have a shape that is symmetrical in the axial direction. As a result, the axial length of the bearing portion can be ensured to its full potential, the angular stiffness of the hydrodynamic bearing device can be increased.

(4)

With the hydrodynamic bearing device 10 in this embodiment, as shown in FIG. 3, a groove with an asymmetrical herringbone shape or spiral shape is employed for the thrust hydrodynamic groove 21a formed in the above-mentioned thrust bearing member 21. Consequently, a circulating force can be imparted to the lubricant 17 in the thrust bearing portion.

(5)

With the hydrodynamic bearing device 10 in this embodiment, as shown in FIGS. 2 and 3, the radial hydrodynamic grooves 11c and 11d formed on the inner peripheral surface of the sleeve 11 have a shape that is symmetrical in the axial direction.

Consequently, there is none of the loss that would otherwise be produced by an asymmetrical shape, so the maximum bearing span can be ensured for the radial bearing portion, and the bearing stiffness of the hydrodynamic bearing device 10 can be increased.

(6)

With the hydrodynamic bearing device 10 in this embodiment, as shown in FIGS. 2 and 3, the thrust bearing member 21 and the sleeve cap 16 disposed opposite each other but close by in the radial direction are such that the thickness of the thrust bearing member 21 in the axial direction is less than, or substantially the same as, the thickness of the sleeve cap 16 in the axial direction.

Consequently, an adequate bearing span can be ensured without it being diminished by the thickness of the thrust bearing member 21.

(7)

With the hydrodynamic bearing device 10 in this embodiment, as shown in FIG. 2, a flangeless shaft 12 is employed, and a retaining structure is constituted by combining the flange 11e formed on the outer peripheral surface of the sleeve 11 with the retainer 15a fixed to the portion of the rotor hub 15 that hangs down.

Consequently, a bearing span that is as large as possible can be ensured in the radial bearing portion, so even though the flangeless shaft 12 is used, the members on the rotating side, including the shaft 12, can be prevented from coming loose with respect to the stationary side, such as the sleeve 11.

(8)

With the hydrodynamic bearing device 10 in this embodiment, the size of the first to fourth gaps G1 to G4 shown in FIG. 2 and elsewhere satisfies the following relational formulas (2) and (3).

$$G1 < G4 \leq G2min < G3 \qquad (2)$$

$$G2min < G2max \qquad (3)$$

Consequently, if the size relationship between the various gaps is specified in the above-mentioned constitution of the hydrodynamic bearing device 10, then a highly reliable hydrodynamic bearing device 10, in which there is no leakage of the lubricant 17 to the outside, can be obtained more effectively.

(9)

With the spindle motor 1 in this embodiment, as shown in FIGS. 1 and 2, the above-mentioned hydrodynamic bearing device 10 is installed.

Consequently, it is possible to provide a spindle motor 1 with which the same effect as above can be obtained, namely, even when the spindle motor 1 or the hydrodynamic bearing device 10 has been made thinner, the maximum bearing span can be ensured in the axial direction for the radial bearing portion, so the angular stiffness of the hydrodynamic bearing device 10 can be increased, and bubbles in the lubricant 17 can be smoothly discharged through the communicating path 11b.

Other Embodiments

Embodiments of the present invention were described above, but the present invention is not limited to the above embodiments, and various modifications are possible without departing from the gist of the invention.

(A)

In the above embodiments, an example was described in which the second gap G2 serving as the lubricant reservoir formed in the gap between the end surface on the open end side of the sleeve 11 and the sleeve cap 16 and the thrust bearing member 21 varied in size in the circumferential direction due to changes in the shape of the sleeve cap 16. The present invention is not limited to this, however.

Figure 9:
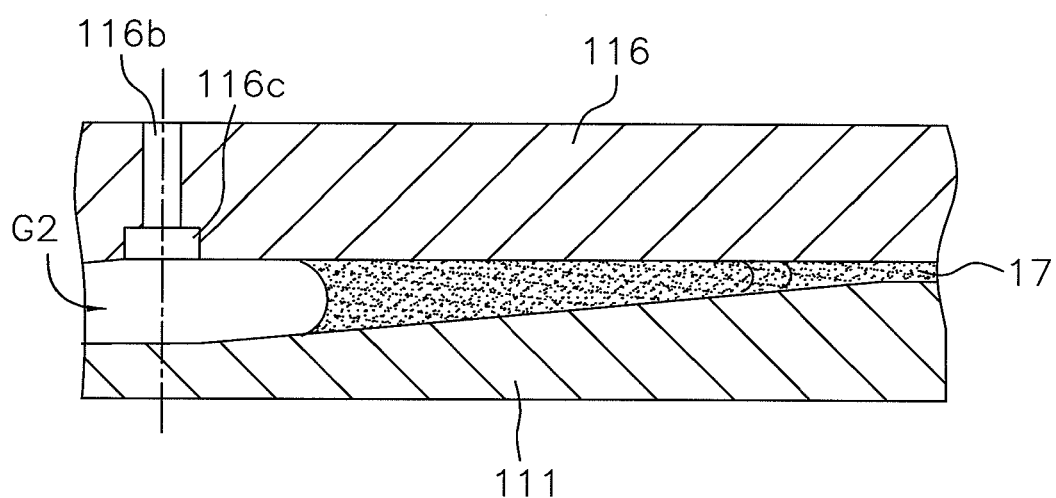
FIG. 9 is a development view of the structure of the lubricant reservoir of the hydrodynamic bearing device pertaining to another embodiment of the present invention.

For instance, as shown in FIG. 9, the constitution may be such that a sleeve cap 116 side is a flat surface, and the shape of the end surface of an opposing sleeve 111 is changed, so that the size of the second gap G2 (lubricant reservoir) is changed in the circumferential direction.

In particular, when a sintered material is used to form the sleeve, this shape can be easily molded using a metal mold.

(B)

In the above embodiments, an example was described in which the second gap G2 serving as the lubricant reservoir was formed only on the end surface on the open end side of the sleeve 11, but the present invention is not limited to this.

Figure 10:
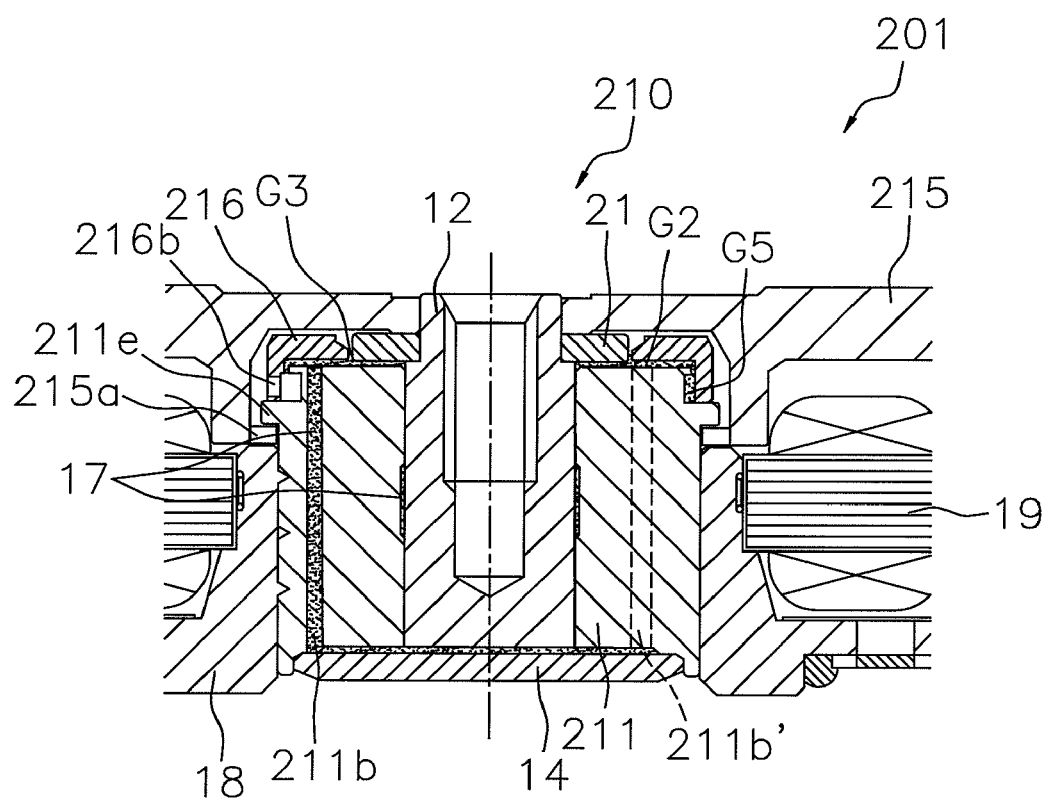
FIG. 10 is a cross section of the structure of the hydrodynamic bearing device pertaining to yet another embodiment of the present invention.

For example, as shown in FIG. 10, the present invention can also be applied to a hydrodynamic bearing device 210 (or spindle motor 201) with a so-called side-seal structure, in which a fifth gap G5 is provided as a lubricant reservoir along the gap between the inner peripheral surface of a sleeve cap 216 and the outer peripheral surface on the outside of a sleeve 211 in the radial direction.

Here, a communicating path 211b is formed near the largest gap part where the fifth gap G5 is largest in the radial direction. Any bubbles that circulate in may be separated by vapor-liquid separation by providing a tapered portion so that the gap increases outward near where the communicating path 211b opens into the second gap G2, and thereby providing communication with the largest gap part.

Also, a communicating path 211b' may be formed near the smallest gap part where the fifth gap G5 is smallest in the radial direction on the opposite side from that in FIG. 10. In this case, bubbles are separated by vapor-liquid separation in the fifth gap, which becomes larger in the circumferential direction from the smallest gap part toward the largest gap part.

Here again, a retaining structure is constituted in which a flange 211e formed on the sleeve 211 comes into contact with a retainer 215a formed on a rotor hub (hub) 215, while the lubricant 17 is circulated through a circulation passage that includes the communicating path 211b, and a ventilation path 216b is provided to the outer peripheral surface of a sleeve cap 216.

(C)

In the above embodiments, an example was described in which the flangeless shaft 12 was employed, and a retaining structure was constituted in which the flange 11e formed on the outer peripheral surface of the sleeve 11 came into contact with the retainer 15a provided to the part of the rotor hub 15 that hung down, but the present invention is not limited to this.

Figure 11:
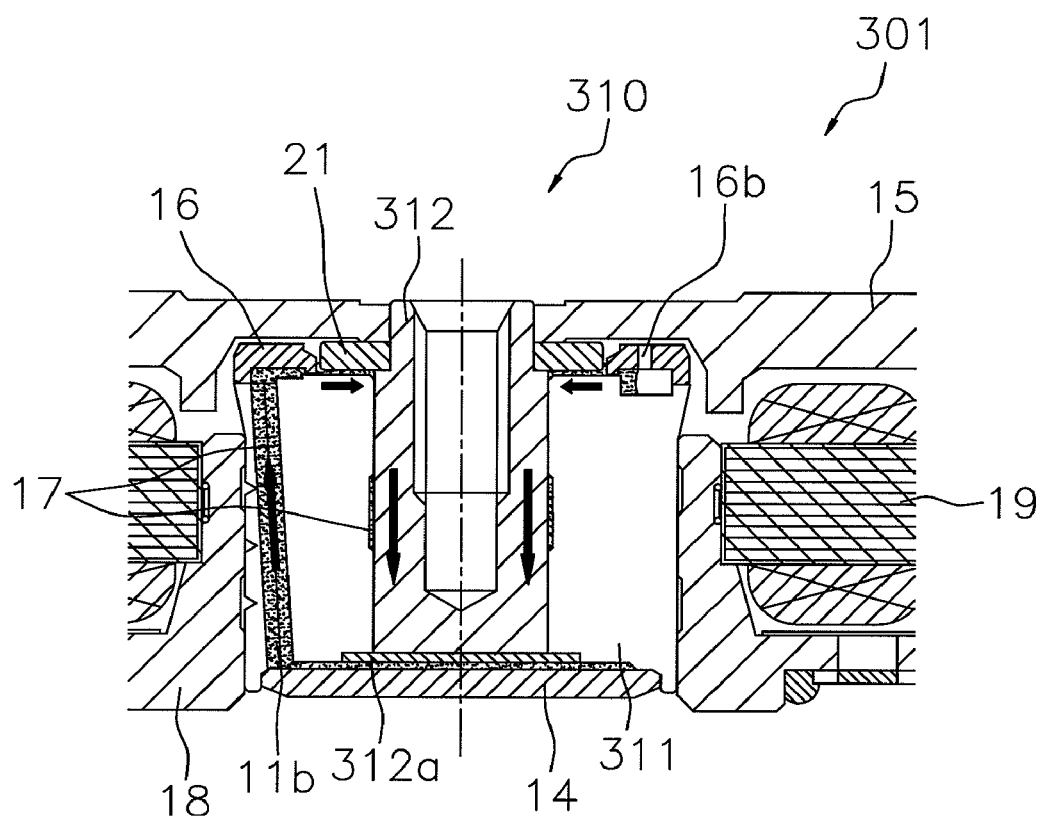
FIG. 11 is a cross section of the structure of the hydrodynamic bearing device pertaining to yet another embodiment of the present invention.

For example, as shown in FIG. 11, the retaining structure may be a hydrodynamic bearing device 310 (or spindle motor 301) in which a thin flange 312a is provided to the end on the closed end side of a shaft 312.

With this constitution, when a thrust hydrodynamic groove is provided to the thrust bearing member 21, there is no need to form a thrust hydrodynamic groove or the like in the flange 312a, so a thinner member can be used as the flange 312a. Thus, here again, the same bearing stiffness as in the above embodiments can be ensured without sacrificing the bearing span of the radial hydrodynamic groove.

(D)

In the above embodiments, an example was described in which a circulating force for circulating the lubricant 17 was produced in the thrust bearing portion disposed between the thrust bearing member 21 and the end surface of the sleeve 11, but the present invention is not limited to this.

Figure 12:
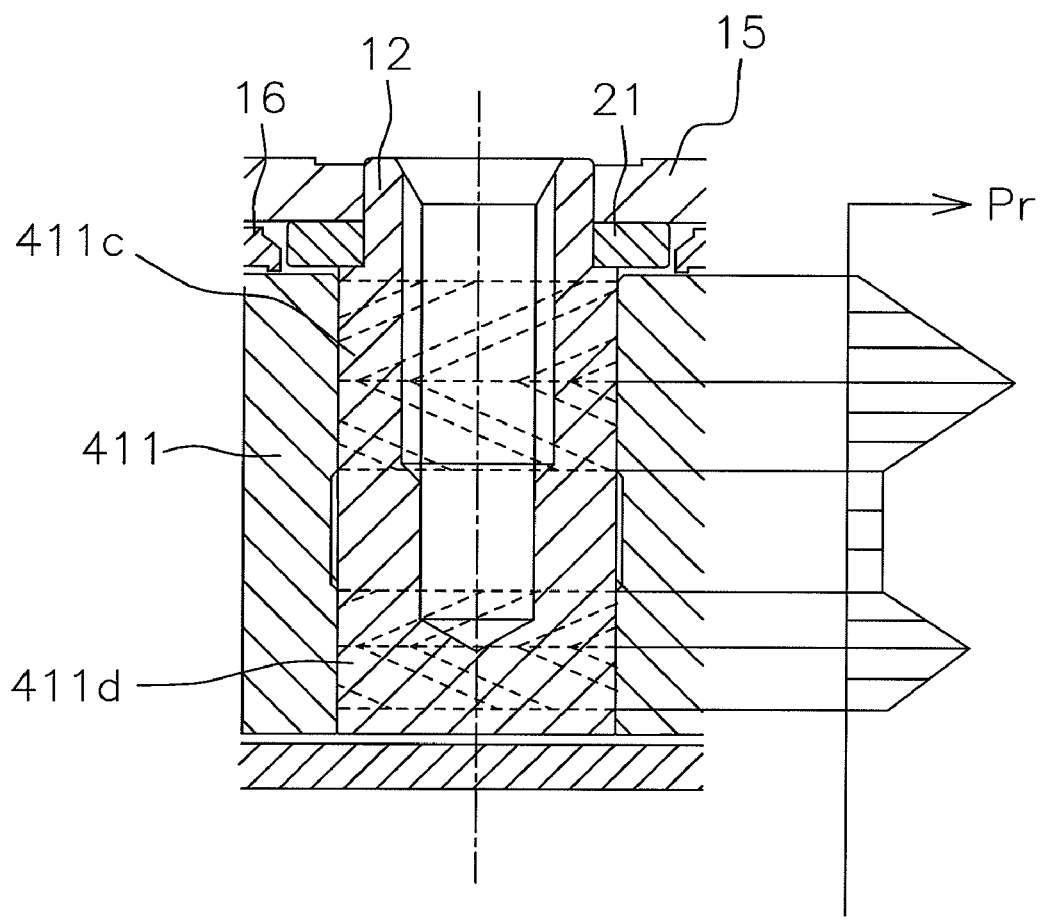
FIG. 12 is a cross section of the structure of the hydrodynamic bearing device pertaining to yet another embodiment of the present invention.

As shown in FIG. 12, for example, the circulating force used to circulate the lubricant may be produced by forming radial hydrodynamic grooves 411c and 411d formed in a sleeve 411 in an asymmetrical shape in the axial direction.

However, since there is some loss of bearing span in the asymmetrical portion when the radial hydrodynamic groove is asymmetrical, in terms of raising bearing stiffness and ensuring the greatest bearing span in the radial hydrodynamic portion, it is preferable for the radial hydrodynamic groove to be symmetrical in the axial direction, just as in the above embodiments.

(E)

Figure 13:
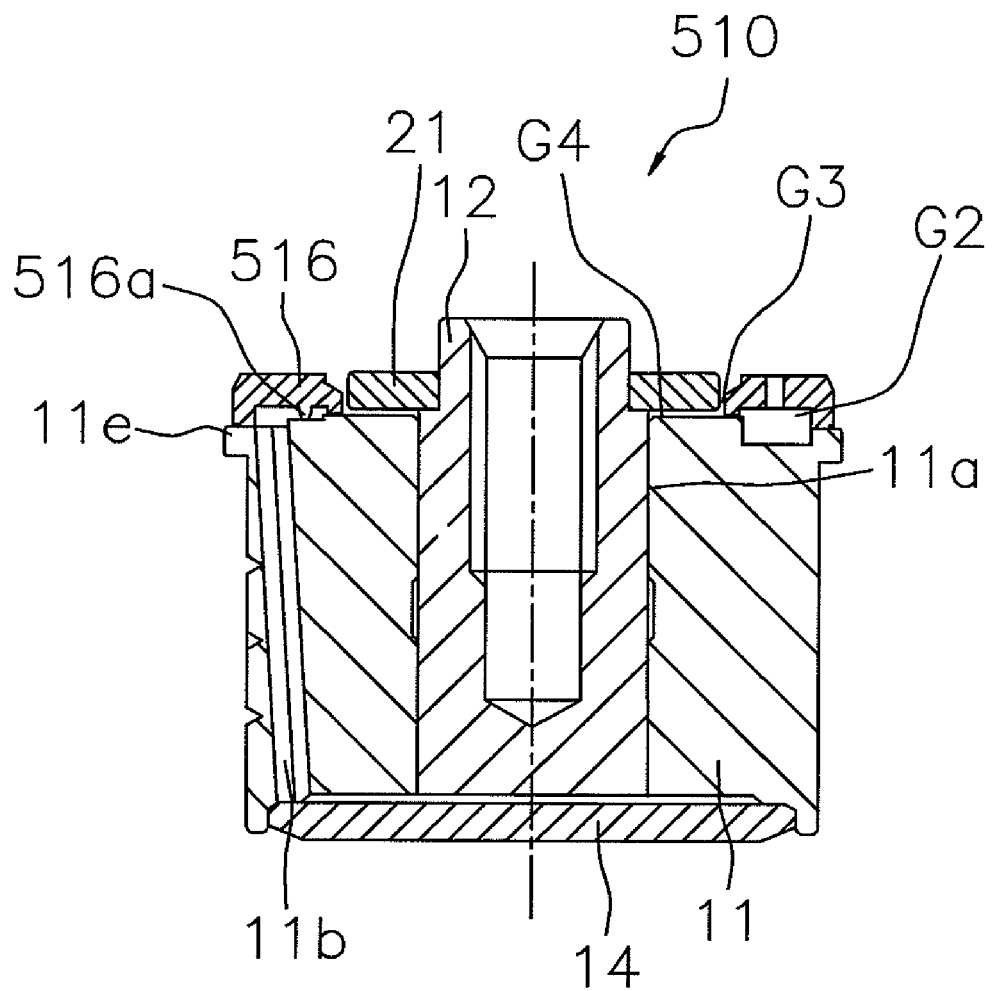
FIG. 13 is a cross section of the structure of the hydrodynamic bearing device pertaining to yet another embodiment of the present invention.

As another embodiment pertaining to the present invention, as shown in FIG. 13, there is a hydrodynamic bearing device 510 in which a plurality of protrusions (convex portions) 516a are provided that protrude from part of the surface of a sleeve cap 516 opposite the sleeve 11.

The protrusions 516a are formed so as to come into partial contact with the end surface on the open end side of the sleeve 11 at a plurality of places, and the size of the gap (second gap G2) between the end surface on the open end side of the sleeve 11 and the sleeve cap 516 is restricted. Naturally, this does not impede the circulation of the lubricant.

Consequently, even when this sleeve cap 516 is formed from thin metal or resin sheet that is readily deformable, the size of the second gap G2 can be accurately restricted, which affords more accurate management of gap size.

(F)

In the above embodiments, the sleeve 11 was formed from a copper alloy, stainless steel, or another such metal material, but the present invention is not limited to this.

For example, a sleeve may be used that is formed from a sintered iron material, and the pores on the surface of which are sealed by completely embedding with a film of resin, triiron tetroxide, or diiron trioxide, plating, or the like.

(G)

Figure 14:
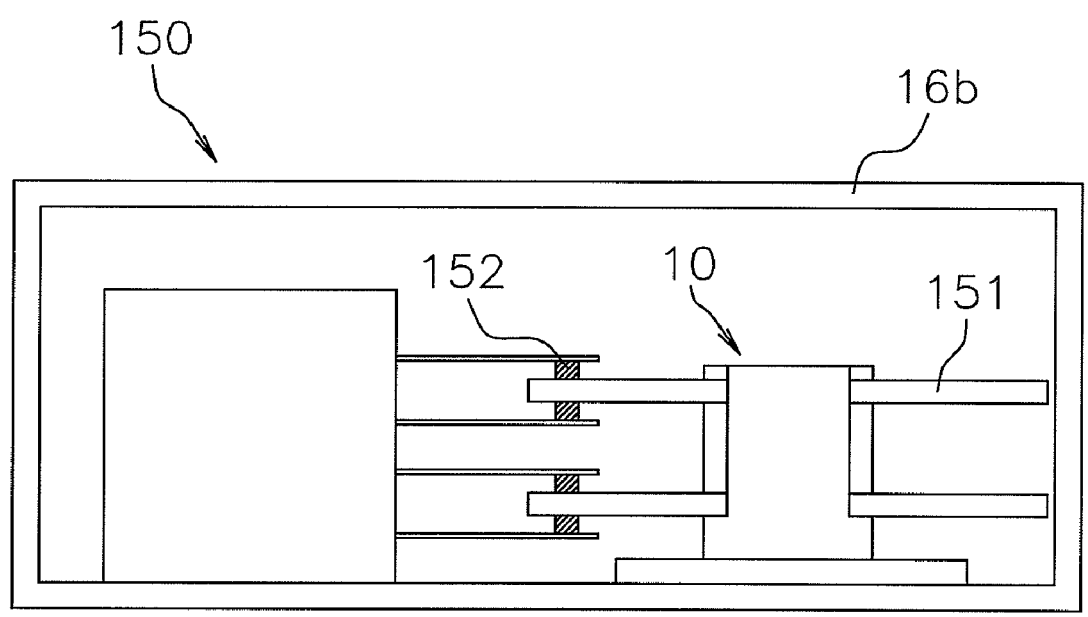
FIG. 14 is a cross section of the simplified structure of a recording and reproducing device equipped with a spindle motor including the hydrodynamic bearing device of the present invention.

Also, as shown in FIG. 14, the recording and reproduction device in which the hydrodynamic bearing device or spindle motor pertaining to the present invention is installed is not limited to the magnetic recording and reproduction device 150 that records and reproduces information to and from the recording disk 151 with a recording head 152, and the installation may, for example, be in a recording and reproducing device that makes use of optical disks.

Furthermore, the present invention may be applied to a hydrodynamic bearing device included in a spindle motor that rotates a cooling fan installed in a CPU (information processing device).

(H)

In the above embodiments, an example was described in which the second gap G2 serving as the lubricant reservoir formed in the gap between the end surface on the open end side of the sleeve 11 and the sleeve cap 16 and the thrust bearing member 21 varied in size in the circumferential direction, but the present invention is not limited to this.

Figure 15:
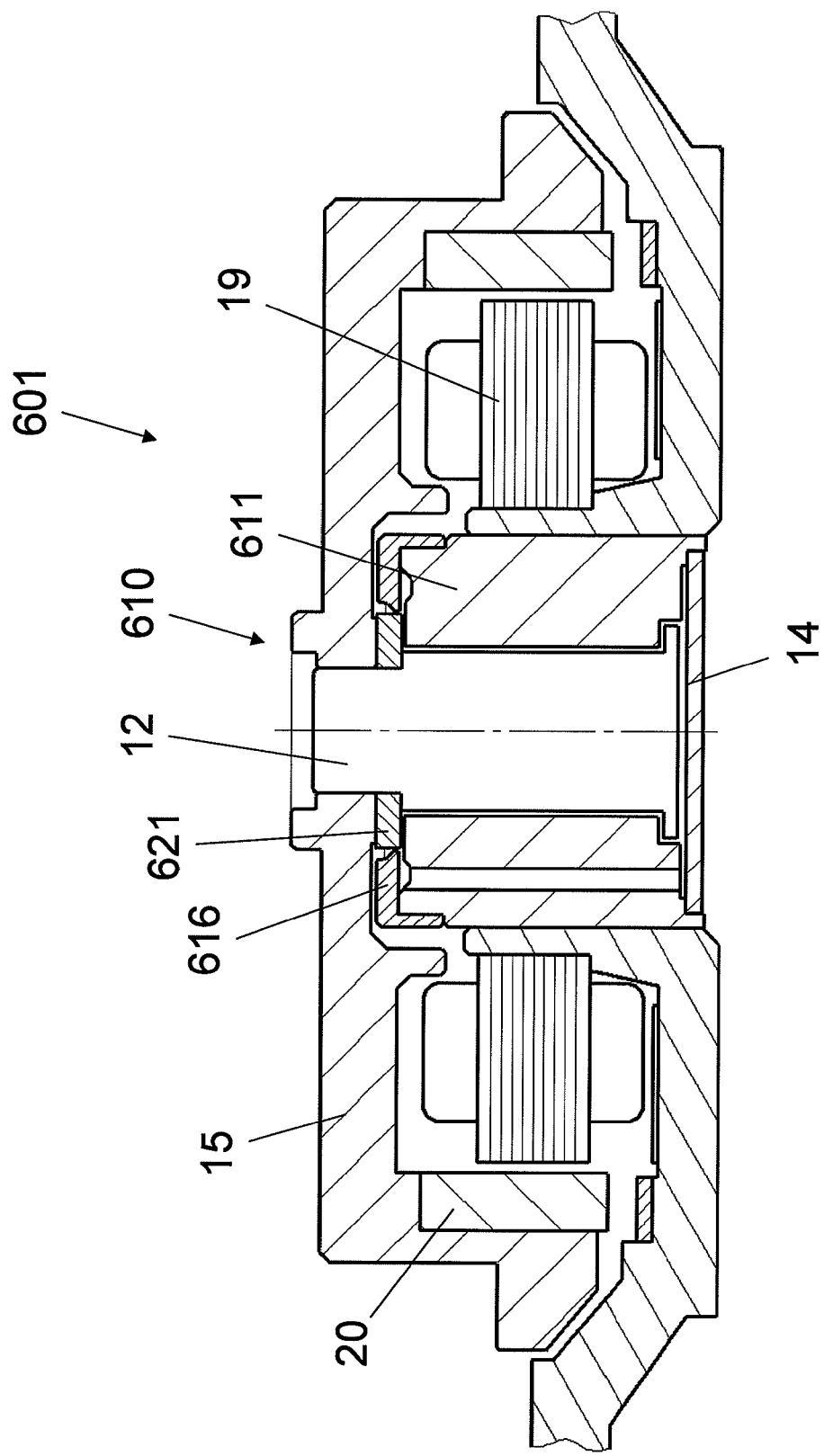
FIG. 15 is a cross section of the structure of the spindle motor pertaining to another embodiment of the present invention.
Figure 16:
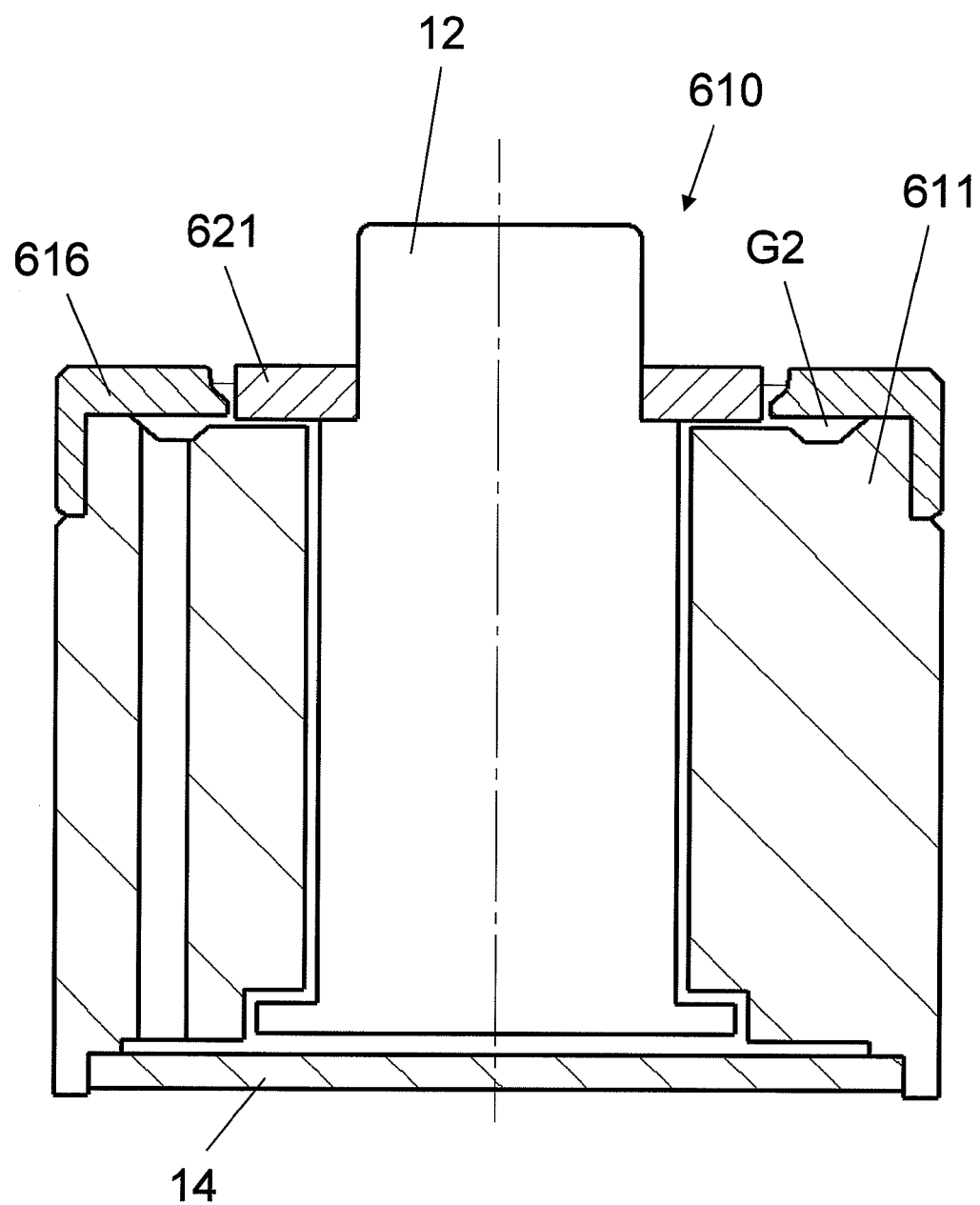
FIG. 16 is a cross section of the structure of the hydrodynamic bearing device installed in the spindle motor of FIG. 15.

For example, as shown in FIGS. 15 and 16, there may be a hydrodynamic bearing device 610 in which the size of the second gap G2 serving as the lubricant reservoir and formed in the gap between the end surface on the open end side of a sleeve 611 and a sleeve cap 616 and a thrust bearing member 621 is constant in the circumferential direction, and a spindle motor 601 equipped with this hydrodynamic bearing device.

(I)

In the above embodiments, an example was described in which the communicating path 11b of the sleeve 11 was formed in a state of being tilted with respect to the axial direction, but the present invention is not limited to this.

For example, the communicating path may be formed straight and substantially parallel to the axial direction.

INDUSTRIAL APPLICABILITY

With the hydrodynamic bearing device of the present invention, even if the hydrodynamic bearing device is made thinner, the maximum axial length of the bearing can be ensured, so the angular stiffness of the hydrodynamic bearing device can be increased, and any bubbles can be smoothly discharged through the communicating path, so the present invention can be widely applied to hydrodynamic bearing devices that are installed in a variety of information processing devices.

What is claimed is:

1. A hydrodynamic bearing device, comprising:
   a shaft;
   a sleeve that has a bearing hole wherein the shaft is mounted in said bearing hole in a state of being capable of relative rotation;
   a first gap that is formed between the shaft and the bearing hole of the sleeve;
   a communicating path that is formed in part of the sleeve and allows communication between an open end side and a closed end side of the bearing hole in the sleeve;
   a first hydrodynamic groove that is formed in the outer peripheral surface of the shaft and/or the inner peripheral surface of the bearing hole of the sleeve;
   a sleeve cap that is provided on an open end side of the sleeve and has a center hole;
   a substantially circular second gap that is formed between the sleeve cap and the end surface on the open end side of the sleeve, and forms a lubricant reservoir;
   a thrust bearing member that is fixed to the open end side of the shaft and is disposed so as to be near the inner peripheral surface of the center hole of the sleeve cap;
   a third gap that is formed between the outer periphery of the thrust bearing member and the inner peripheral surface of the center hole of the sleeve cap, and is open to the atmosphere;
   a fourth gap that is formed between the thrust bearing member and the end surface of the sleeve;
   a lubricant that accumulates in the first gap, the communicating path, the second gap, and the fourth gap, wherein the first gap, the communicating path, the second gap, and the fourth gap communicate with each other; and
   a circulation passage that includes the communicating path, the first gap, and the second gap, wherein the lubricant circulates through said circulation passage.

2. The hydrodynamic bearing device according to claim 1, wherein the second gap that forms the lubricant reservoir is such that the size of the gap varies in the circumferential direction.

3. The hydrodynamic bearing device according to claim 1, wherein a second hydrodynamic groove that imparts a circulating force to the lubricant is formed in one or both of the opposite surfaces of the thrust bearing member and the end surface of the sleeve, that are opposite each other in the fourth gap.

4. The hydrodynamic bearing device according to claim 3, wherein the second hydrodynamic groove has an asymmetrical herringbone or spiral shape.

5. The hydrodynamic bearing device according to claim 3, wherein the first hydrodynamic groove has a symmetrical shape.

6. The hydrodynamic bearing device according to claim 1, wherein the sleeve cap has at its end surface a ventilation path that allows the second gap to communicate with the outside.

7. The hydrodynamic bearing device according to claim 1, wherein the second gap has a smallest gap part that is smallest in size in the axial direction near the communicating path, and has a largest gap part near the ventilation path that is largest in size in the axial direction from the communicating path toward the ventilation path, with the gap steadily increasing from the smallest gap part toward the largest gap part in the circumferential direction.

8. The hydrodynamic bearing device according to claim 1, further comprising a substantially circular fifth gap that is formed between the inner peripheral surface of the sleeve cap and the outer peripheral surface of the sleeve, and forms a lubricant reservoir.

9. The hydrodynamic bearing device according to claim 8, wherein the fifth gap that forms the lubricant reservoir is such that the size of the gap varies in the circumferential direction.

10. The hydrodynamic bearing device according to claim 8, wherein the sleeve cap has on its outer peripheral surface a ventilation path that allows the fifth gap to communicate with the outside.

11. The hydrodynamic bearing device according to claim 8, wherein the fifth gap has a smallest gap part that is smallest in size in the radial direction near the communicating path, and has a largest gap part near the ventilation path that is largest in size in the radial direction from the communicating path toward the ventilation path, with the gap steadily increasing from the smallest gap part toward the largest gap part in the circumferential direction.

12. The hydrodynamic bearing device according to claim 1, wherein the axial thickness of the thrust bearing member is less than or substantially equal to the axial thickness of the sleeve cap.

13. The hydrodynamic bearing device according to claim 1, wherein the shaft is flangeless, further comprising a hub that is fixed to the end of the shaft on the open end side, wherein the sleeve has a flange that protrudes outward in the radial direction, and the hub has a retainer that limits movement in the axial direction.

14. The hydrodynamic bearing device according to claim 1, wherein the shaft has a closed end side, and a retainer flange on the closed end side.

15. The hydrodynamic bearing device according to claim 1, wherein, G1 denotes the size of the first gap, G2min denotes the size of the smallest gap part of the second gap, G2max denotes the largest gap part of the second gap, G3 denotes the size of the third gap, G4 denotes the smallest gap part of the fourth gap, and the following relational formulas are satisfied:

$G1 < G4 \leq G2min < G3$; and $G2min < G2max$.

16. The hydrodynamic bearing device according to claim 1, wherein the sleeve cap further has a plurality of protrusions which protrude toward the end surface of the sleeve, are disposed opposite each other, and come into contact with the end surface on the open end side of the sleeve.

17. The hydrodynamic bearing device according to claim 1, wherein the sleeve cap is formed from a translucent material.

18. The hydrodynamic bearing device according to claim 17, wherein the sleeve cap includes a translucent portion on the end surface where the ventilation path is formed.

19. The hydrodynamic bearing device according to claim 17, wherein the sleeve cap includes a translucent portion on the outer peripheral surface side where the ventilation path is formed.

20. A spindle motor, comprising:
the hydrodynamic bearing device according to claim 1;
a rotary magnet attached to a rotating-side member of the hydrodynamic bearing device; and
a stator core that imparts rotational force to the rotary magnet.

21. An information apparatus wherein the spindle motor according to claim 20 is installed.

* * * * *